US011898015B2

(12) United States Patent
Dhodapkar et al.

(10) Patent No.: US 11,898,015 B2
(45) Date of Patent: Feb. 13, 2024

(54) COATED OLEFIN-BASED POLYMERS WITH REDUCED BLOCKING

(71) Applicant: Dow Global Technologies LLC, Midland, MI (US)

(72) Inventors: Shrikant Dhodapkar, Lake Jackson, TX (US); Remi A. Trottier, Angleton, TX (US); George W. Haun, Jr., Baton Rouge, LA (US); Harold W. Boone, Houston, TX (US); Intan M. Hamdan, Pearland, TX (US); Michael D. Turner, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/256,995

(22) PCT Filed: Jun. 28, 2019

(86) PCT No.: PCT/US2019/039800
§ 371 (c)(1),
(2) Date: Dec. 29, 2020

(87) PCT Pub. No.: WO2020/006396
PCT Pub. Date: Jan. 2, 2020

(65) Prior Publication Data
US 2021/0363310 A1     Nov. 25, 2021

Related U.S. Application Data

(60) Provisional application No. 62/692,271, filed on Jun. 29, 2018.

(51) Int. Cl.
*C08J 3/12* (2006.01)

(52) U.S. Cl.
CPC ............ *C08J 3/126* (2013.01); *C08J 3/124* (2013.01); *C08J 3/128* (2013.01); *C08J 2323/16* (2013.01); *C08J 2383/07* (2013.01)

(58) Field of Classification Search
CPC ......... Y10T 428/2991; Y10T 428/2995; Y10T 428/2998; C08J 3/126; C08J 3/128; C08K 5/098; C08K 5/5415
(Continued)

(56) References Cited

U.S. PATENT DOCUMENTS

| 4,151,135 A | 4/1979 | McClain |
| 4,960,644 A | 10/1990 | Hyche et al. |

(Continued)

FOREIGN PATENT DOCUMENTS

| EP | 0749454 | 12/1996 |
| JP | 2001342259 A | 12/2001 |

(Continued)

OTHER PUBLICATIONS

Peter Greven brochure, Selecting metal soaps for optimum acid scavenging performance in polyolefin, POLYOLEFIN ADDITIVES 2018 Conference—Cologne (Germany) (Year: 2018).*

(Continued)

*Primary Examiner* — Hoa (Holly) Le

(57) ABSTRACT

A process to form coated polymer particles comprising polymer particles formed from a polymer composition comprising an olefin-based polymer, and a coating formed from a coating composition comprising an aqueous metal acid dispersion and an aqueous polysiloxane emulsion, said process comprising the following: mixing together the aqueous metal acid dispersion and the aqueous polysiloxane emulsion to form a dispersion/emulsion mixture; applying the dispersion/emulsion mixture to a portion of the surfaces of the polymer particles to form wet-coated polymer par- (Continued)

ticles; drying the wet-coated polymer particles to form the coated polymer particles. The aqueous metal acid dispersion and the aqueous polysiloxane emulsion may also be applied, individually, in separate steps.

12 Claims, 2 Drawing Sheets

(58) Field of Classification Search
USPC .......................................... 428/403, 405, 407
See application file for complete search history.

(56) References Cited

U.S. PATENT DOCUMENTS

| | | | |
|---|---|---|---|
| 5,007,961 A | 4/1991 | Hyche et al. | |
| 5,096,493 A | 3/1992 | Hyche et al. | |
| 5,334,644 A | 8/1994 | Gose et al. | |
| 5,443,910 A | 8/1995 | Gose et al. | |
| 6,120,899 A | 9/2000 | Cameron et al. | |
| 6,228,902 B1 | 5/2001 | Brueggeman et al. | |
| 6,403,677 B1 | 6/2002 | Walker | |
| 6,756,116 B2 | 6/2004 | Roach | |
| 7,122,584 B2 | 10/2006 | Moriya et al. | |
| 8,173,209 B2 | 5/2012 | Chereau et al. | |
| 8,617,709 B2 | 12/2013 | Komiya et al. | |
| 8,986,442 B2 | 3/2015 | Luginsland et al. | |
| 9,169,374 B2 | 10/2015 | Hernandez-Zamora et al. | |
| 9,290,668 B2 | 3/2016 | Dhodapkar et al. | |
| 9,683,089 B2 | 6/2017 | Brown et al. | |
| 9,758,626 B2 | 9/2017 | Armstrong et al. | |
| 10,683,398 B2 * | 6/2020 | Dhodapkar | C08K 5/5415 |
| 2010/0124607 A1 * | 5/2010 | Berti | C08J 3/124 |
| | | | 427/207.1 |
| 2013/0101852 A1 | 4/2013 | Dhodapkar et al. | |
| 2018/0265650 A1 * | 9/2018 | Dhodapkar | C08J 3/128 |

FOREIGN PATENT DOCUMENTS

| | | | |
|---|---|---|---|
| WO | 1990002770 | 3/1990 | |
| WO | 2001012716 | 2/2001 | |
| WO | 2009035877 | 3/2009 | |
| WO | 2017049064 | 3/2017 | |
| WO | WO-2017049064 A1 * | 3/2017 | ................ B01J 2/30 |

OTHER PUBLICATIONS

PCT/US2019/039800, International Search Report and Written Opinion dated Oct. 31, 2019.
PCT/US2019/039800, International Preliminary Report on Patentability dated Dec. 29, 2020.

* cited by examiner

COATED OLEFIN-BASED POLYMERS WITH REDUCED BLOCKING

CROSS-REFERENCE TO RELATED APPLICATIONS

The present application claims the benefit of priority to U.S. patent application No. 62/692,271, filed on Jun. 29, 2018, which is incorporated herein by reference in its entirety.

BACKGROUND

Olefin-based polymer particles, and in particular amorphous polymers, are prone to clumping, sheeting and arching (bridging), as the particles are conveyed from a dryer, such as a spin dryer, to packaging equipment. Any temporary stoppage or hold-up (e.g., in bagging equipment) can result in a complete blockage, due to an agglomeration of the particles. After the particles (for example, pellets) are packaged in bags, the bags are conveyed to the palletizer, typically on a belt conveyor. Rapid blocking of the pellets on the conveyor will result in palletizer malfunction, which, in turn, shuts down the entire packaging equipment operation, and results in the scrapping of the polymer pellets. Semi-crystalline polymers can also mass together during storage. Conventional measures for improving the shelf life of the polymer pellets include maintaining the pellets at cooler temperatures, and the use of anti-stick agents, such as PDMS. However, these measures are ineffective when the residence time of the pellets, in the packaging line, typically exceeds 30 seconds. Moreover, excess amount of PDMS on pellet surface has negative consequences to the final product use.

Polymer pellets and coating compositions are described in the following references: U.S. Pat. Nos. 7,122,584, 8,986, 442, 6,756,116, 9,290,668, 9,169,374, WO 2017/049064, WO 2001/012716, WO 2009/035877, U.S. Pat. Nos. 4,960, 644; 5,007,961; 6,120,899, 8,173,209, 6,228,902, 9,758, 626, 9,683,089, 5,096,493; 5,334,644; 5,443,910; 6,403, 677; Walker, EP 0749454 A1; and US Patent Publication: US 2013/0101852.

Thus, there is a need for improved polymer pellets, and processes to make the same, with increased shelf life, and which can be reliably used in packaging operations. These needs are provided by the following invention.

SUMMARY OF THE INVENTION

A process to form coated polymer particles, comprising polymer particles formed from a polymer composition comprising an olefin-based polymer, and a coating formed from a coating composition comprising an aqueous metal acid dispersion and an aqueous polysiloxane emulsion, said process comprising the following:

mixing together the aqueous metal acid dispersion and the aqueous polysiloxane emulsion to form a dispersion/emulsion mixture;

applying the dispersion/emulsion mixture to a portion of the surfaces of the polymer particles to form wet-coated polymer particles;

drying the wet-coated polymer particles to form the coated polymer particles.

A process to form coated polymer particles, comprising polymer particles formed from a polymer composition comprising an olefin-based polymer, and a coating formed from a coating composition comprising an aqueous metal acid dispersion and an aqueous polysiloxane emulsion, said process comprising the following:

A) applying the aqueous polysiloxane emulsion to a portion of the surfaces of the polymer particles to form emulsion-coated polymer particles;

B) applying the aqueous metal acid dispersion to a portion of the surfaces of the emulsion-coated polymer particles to form dispersion-emulsion-coated polymer particles;

C) drying the dispersion-emulsion-coated polymer particles to form the coated polymer particles; and wherein, optionally, the emulsion-coated polymer particles from step A are dried, before step B.

A process to form coated polymer particles comprising polymer particles formed from a polymer composition comprising an olefin-based polymer, and a coating formed from a coating composition comprising an aqueous metal acid dispersion and an aqueous polysiloxane emulsion, said process comprising the following:

A) applying the aqueous metal acid dispersion to a portion of the surfaces of the polymer particles to form dispersion-coated polymer particles;

B) applying the aqueous polysiloxane emulsion to a portion of the surfaces of the dispersion-coated polymer particles to form emulsion-dispersion-coated polymer particles;

C) drying the emulsion-dispersion-coated polymer particles to form the coated polymer particles; and wherein, optionally, the dispersion-coated polymer particles from step A are dried, before step B.

A composition comprising coated polymer particles, which comprise polymer particles formed from a polymer composition comprising an olefin-based polymer, and a coating formed from a coating composition comprising an aqueous metal acid dispersion and an aqueous polysiloxane emulsion; and wherein the weight ratio of the polysiloxane emulsion to the metal acid, in the coating, is from 0.10 to 10.0; and wherein the metal acid is present in an amount from greater than zero to 5000 ppm, based on the weight of the coated polymer particles; and wherein the polysiloxane is present in an amount from greater than zero to 500 ppm, based on the weight of the coated polymer particles.

DETAILED DESCRIPTION

Figure 1:
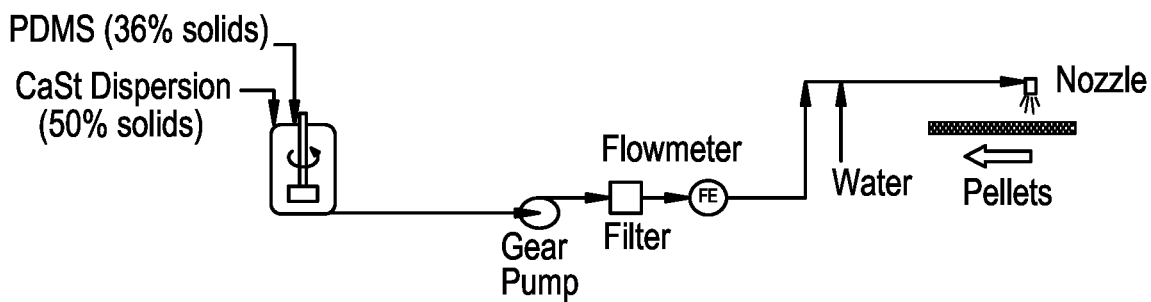
FIG. 1 depicts a coating process using a pre-mix of the aqueous metal acid dispersion and the aqueous polysiloxane emulsion.
Figure 2:
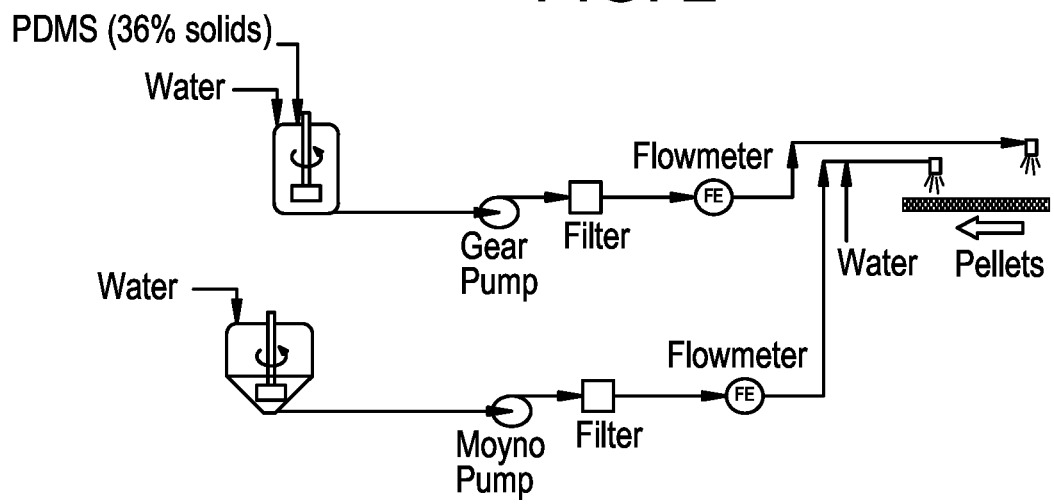
FIG. 2 depicts a coating process using separate systems to apply the aqueous metal acid dispersion and the aqueous polysiloxane emulsion.
Figure 3:
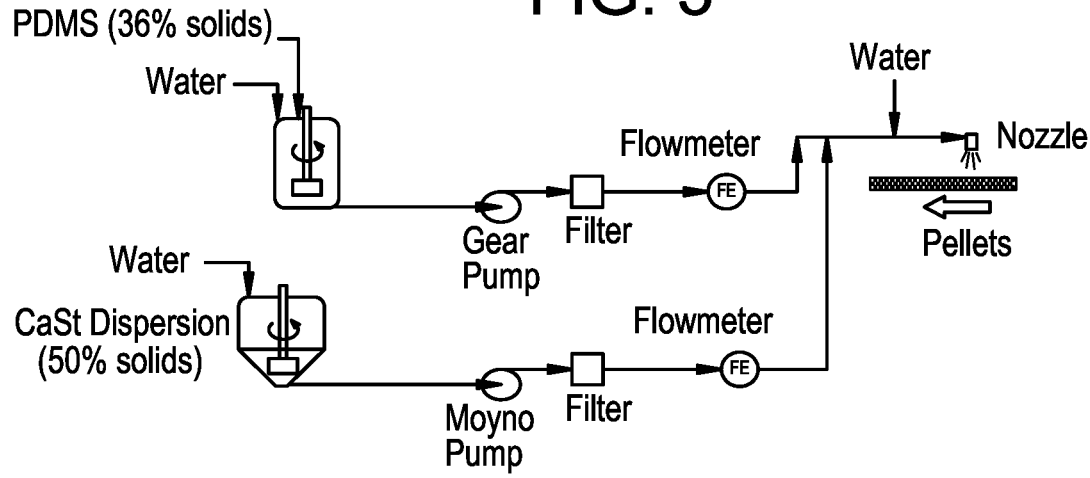
FIG. 3 depicts a coating process using separate systems of the aqueous metal acid dispersion and the aqueous polysiloxane emulsion, which are admixed, and the admixture is applied to the polymer particles.
Figure 4:
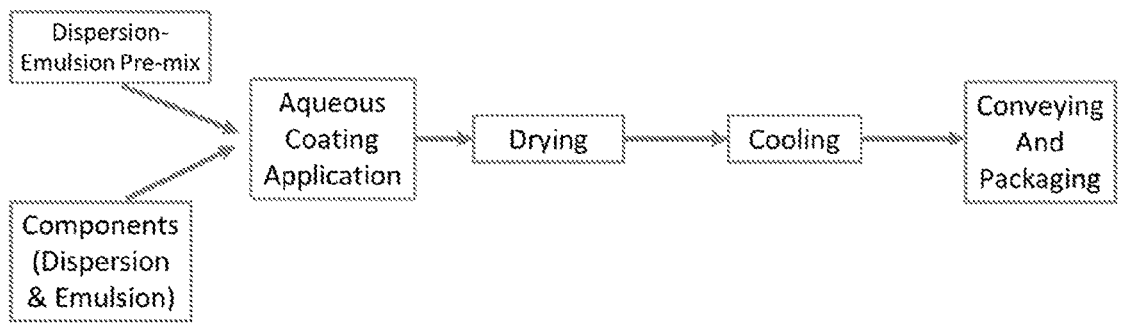
FIG. 4 depicts a "one step" coating process flow diagram.
Figure 5:
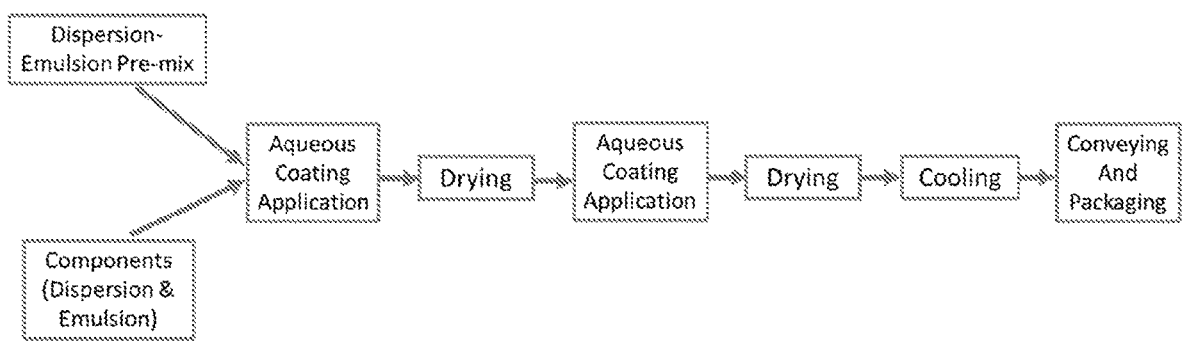
FIG. 5 depicts a "two step" coating process flow diagram.

It has been discovered that the processes and compositions described above, and herein, provides polymer particles (for example, polymer pellets) with excellent handling. It has also been discovered that such processes and compositions provide good anti-blocking and anti-stickiness performance; no or minimal interactions with additive packages, which can form color bodies upon melt processing; no or minimal taste or odor issues (for example, from the pellets or after melt processing of the pellets); and no residual solvent issues. Additional benefits include the following: no increase gels in film applications, maintained adhesion and mechanical properties, no or minimal fouling during drying processes, and no or minimal cross contamination on commercial trains.

Also, the coating compositions, as described above and herein, can be applied to the polymer particles, after the particles exit a dryer (for example, a spin dryer), or before the particles enter the drying zone of a fluidized bed dryer. Each of the component of the coating composition can also be added separately, resulting in the same outcome. For example, the aqueous polysiloxane emulsion can be applied to the particles first, followed by a drying step. Then the aqueous metal acid can then applied to the polymer particles, with an optional drying step.

As discussed above, in a first aspect, a process is provided to form coated polymer particles, comprising polymer particles formed from a polymer composition comprising an olefin-based polymer, and a coating formed from a coating composition comprising an aqueous metal acid dispersion and an aqueous polysiloxane emulsion, said process comprising the following:

mixing together the aqueous metal acid dispersion and the aqueous polysiloxane emulsion to form a dispersion/emulsion mixture;

applying the dispersion/emulsion mixture to a portion of the surfaces of the polymer particles to form wet-coated polymer particles;

drying the wet-coated polymer particles to form the coated polymer particles.

In a second aspect, a process is provided to form coated polymer particles, comprising polymer particles formed from a polymer composition comprising an olefin-based polymer, and a coating formed from a coating composition comprising an aqueous metal acid dispersion and an aqueous polysiloxane emulsion, said process comprising the following:

A) applying the aqueous polysiloxane emulsion to a portion of the surfaces of the polymer particles to form emulsion-coated polymer particles;

B) applying the aqueous metal acid dispersion to a portion of the surfaces of the emulsion-coated polymer particles to form dispersion-emulsion-coated polymer particles;

C) drying the dispersion-emulsion-coated polymer particles to form the coated polymer particles; and wherein, optionally, the emulsion-coated polymer particles from step A are dried, before step B.

In a third aspect, a process is provided to form coated polymer particles, comprising polymer particles formed from a polymer composition comprising an olefin-based polymer, and a coating formed from a coating composition comprising an aqueous metal acid dispersion and an aqueous polysiloxane emulsion, said process comprising the following:

A) applying the aqueous metal acid dispersion to a portion of the surfaces of the polymer particles to form dispersion-coated polymer particles;

B) applying the aqueous polysiloxane emulsion to a portion of the surfaces of the dispersion-coated polymer particles to form emulsion-dispersion-coated polymer particles;

C) drying the emulsion-dispersion-coated polymer particles to form the coated polymer particles; and wherein, optionally, the dispersion-coated polymer particles from step A are dried, before step B.

In a fourth aspect, a composition is provided, said composition comprising coated polymer particles, which comprise polymer particles formed from a polymer composition comprising an olefin-based polymer, and a coating formed from a coating composition comprising an aqueous metal acid dispersion and an aqueous polysiloxane emulsion; and wherein the metal acid is present in an amount from greater than zero to 5000 ppm, or 4000 ppm, or 3000 ppm, or 2000 ppm, or 1000 ppm, or 950 ppm, or 900 ppm, or 850 ppm, or 800 ppm, or 750 ppm, or 700 ppm, or 650 ppm, or 600 ppm, or 550 ppm, or 500 ppm, or 450 ppm, or 400 ppm, or 350 ppm, or 300 ppm, based on the weight of the coated polymer particles; and wherein the polysiloxane is present in an amount from greater than zero to 500 ppm, or 450 ppm, or 400 ppm, or 350 ppm, or 300 ppm, based on the weight of the coated polymer particles.

In a fifth aspect, a process is provided to form coated polymer particles, comprising polymer particles formed from a polymer composition comprising an olefin-based polymer, and a coating formed from a coating composition comprising an aqueous metal acid dispersion and an aqueous polysiloxane emulsion, said process comprising the following:

mixing together the aqueous metal acid dispersion and the aqueous polysiloxane emulsion at a mixing ratio of the aqueous polysiloxane emulsion to the aqueous metal acid dispersion to form a dispersion/emulsion mixture, wherein the mixing ratio of the aqueous polysiloxane emulsion to the aqueous metal acid dispersion is from greater than or equal to 0.05 to less than or equal to 0.8;

applying the dispersion/emulsion mixture to a portion of the surfaces of the polymer particles to form wet-coated polymer particles;

drying the wet-coated polymer particles to form the coated polymer particles.

An inventive process may comprise a combination of two or more embodiments described herein.

An inventive composition may comprise a combination of two or more embodiments described herein.

The following embodiments, except where noted, apply to all five aspects described above.

In one embodiment, or a combination of embodiments described herein, wherein metal of the metal acid is selected from calcium, zinc or barium.

In one embodiment, or a combination of embodiments described herein, the metal acid comprises a metal stearate, and further a calcium stearate.

In one embodiment, or a combination of embodiments described herein, the metal acid is comprises a metal stearate, and further a calcium stearate, and a metal C16 fatty acid, and further a calcium C16 fatty acid.

For the fourth aspect, in one embodiment, or a combination of embodiments described herein, the weight ratio of the polysiloxane to the metal acid, in the coating, is from 0.10 to 10.0, or from 0.15 to 10.0, or from 0.20 to 10.0, or from 0.25 to 10.0, or from 0.30 to 10.0, or from 0.35 to 9.0, or from 0.40 to 8.0, or from 0.45 to 7.0, or from 0.50 to 6.0, or from 0.55 to 5.0 or from 1.0 to 10.0, or from 1.1 to 9.0, or from 1.2 to 8.0, or from 1.3 to 7.0, or from 1.4 to 6.0, or from 1.5 to 5.0.

For the fourth aspect, in one embodiment, or a combination of embodiments described herein, the metal acid is present in an amount from greater than zero to 5000 ppm, or from 2 ppm to 5000 ppm, or from 2 ppm to 4000 ppm, or from 2 ppm to 3000 ppm, or from 2 ppm to 2000 ppm, or from 2 ppm to 1000 ppm, or from 2 ppm to 900 ppm, or from 2 ppm to 800 ppm, based on the weight of the coated polymer particles.

For the fourth aspect, in one embodiment, or a combination of embodiments described herein, the poly-siloxane is present in an amount from greater than zero to 500 ppm, or from 20 ppm to 500 ppm, or from 20 ppm to 300 ppm, or from 30 ppm to 300 ppm, or from 40 ppm to 300 ppm, or from 50 ppm to 300 ppm, based on the weight of the coated polymer particles.

For the fifth aspect, in one embodiment, or a combination of embodiments described herein, the mixing ratio of the aqueous polysiloxane emulsion to the aqueous metal acid dispersion is from greater than or equal to 0.05 to less than or equal to 0.8, or from greater than or equal to 0.1 to less than or equal to 0.8, or from greater than or equal to 0.2 to less than or equal to 0.8, or from greater than or equal to 0.3 to less than or equal to 0.8, or from greater than or equal to 0.3 to less than or equal to 0.6, or from greater than or equal to 0.3 to less than or equal to 0.5.

For the fifth aspect, in one embodiment, or a combination of embodiments described herein, the aqueous polysiloxane emulsion is an emulsion of PDMS oil in aqueous media.

For the fifth aspect, in one embodiment, or a combination of embodiments described herein, the aqueous metal acid dispersion is a mixture of calcium stearate (C18) and calcium palmitate (C16) dispersed in aqueous media.

For the fifth aspect, in one embodiment, or a combination of embodiments described herein, the aqueous polysiloxane emulsion is XIAMETER MEM-0024 and the aqueous metal acid dispersion is CHRISCOAT 50EF-SD628.

In one embodiment, or a combination of embodiments described herein, the metal acid is calcium stearate.

In one embodiment, or a combination of embodiments described herein, the polysiloxane is polydimethylsiloxane (PDMS).

In one embodiment, or a combination of embodiments described herein, the dispersion/emulsion mixture is added to pelletization water, and wherein the polymer particles are added to the pelletization water.

In one embodiment, or a combination of embodiments described herein, the aqueous metal acid dispersion or the aqueous polysiloxane emulsion is added to pelletization water, and wherein the polymer particles are added to the pelletization water.

In one embodiment, or a combination of embodiments described herein, for the first and fifth aspects, the dispersion/emulsion mixture is sprayed onto the surface of the polymer particles.

In one embodiment, or a combination of embodiments described herein, for the second and third aspects, the aqueous dispersion and/or the aqueous emulsion is sprayed onto the surface of the polymer particles.

In one embodiment, or a combination of embodiments described herein, for the first and fifth aspects, the wet-coated polymer particles are dried by air drying at ambient temperature, hot-air drying, vacuum drying, or heating. In one embodiment, or a combination of embodiments described herein, for the second aspect, the dispersion-emulsion-coated polymer particles are dried by air drying at ambient temperature, hot-air drying, vacuum drying, or heating. In one embodiment, or a combination of embodiments described herein, for the third aspect, the emulsion-dispersion-coated polymer particles are dried by air drying at ambient temperature, hot-air drying, vacuum drying, or heating. In one embodiment, or a combination of embodiments described herein, for the fourth aspect, the composition is the dry coated composition following any process according to the first, second, third, or fifth aspects.

In one embodiment, or a combination of embodiments described herein, the coating composition is not crosslinked. As used herein, the term "crosslinking" refers to at least 50 wt % of the composition remains insoluble after refluxing in xylene, at a temperature of 140° C. (boiling point of xylene, reflux) for 12 hours. See ASTM D2765.

In one embodiment, or a combination of embodiments described herein, the polymer particles are in the form of pellets.

In one embodiment, or a combination of embodiments described herein, the coating comprises ≤0.10 wt %, or ≤0.05 wt %, or ≤0.01 wt % of an amide-containing compound or an amide-containing polymer, each based on the weight of the coating. In a further embodiment, the coating does not comprise an amide-containing compound of an amide-containing polymer. In one embodiment, or a combination of embodiments described herein, the polymer composition comprises ≤0.10 wt %, or ≤0.05 wt %, or ≤0.01 wt % of an amide-containing compound or an amide-containing polymer, each based on the weight of the polymer composition. In a further embodiment, the polymer composition does not comprise an amide-containing compound of an amide-containing polymer.

In one embodiment, or a combination of embodiments described herein, the coating comprises ≤0.10 wt %, or ≤0.05 wt %, or ≤0.01 wt % of an acid-containing compound or an acid-containing polymer, each based on the weight of the coating. In a further embodiment, the coating does not comprise an acid-containing compound of an acid-containing polymer. In one embodiment, or a combination of embodiments described herein, the polymer composition comprises ≤0.10 wt %, or ≤0.05 wt %, or ≤0.01 wt % of an acid-containing polymer, based on the weight of the polymer composition. In a further embodiment, the polymer composition does not comprise an acid-containing polymer.

In one embodiment, or a combination of embodiments described herein, the coating comprises ≤0.10 wt %, or ≤0.05 wt %, or ≤0.01 wt % of ethylene-vinyl acetate (herein after referred to as EVA), based on the weight of the coating. In a further embodiment, the coating does not comprise EVA. In one embodiment, or a combination of embodiments described herein, the polymer composition comprises ≤0.10 wt %, or ≤0.05 wt %, or ≤0.01 wt % of EVA, based on the weight of the polymer composition. In a further embodiment, the polymer composition does not comprise EVA.

In one embodiment, or a combination of embodiments described herein, the coating comprises ≤0.10 wt %, or ≤0.05 wt %, or ≤0.01 wt % of a propylene-based polymer, based on the weight of the coating. In a further embodiment, the coating does not comprise a propylene-based polymer. In one embodiment, or a combination of embodiments described herein, the polymer composition comprises ≤0.10 wt %, or ≤0.05 wt %, or ≤0.01 wt % of a propylene-based polymer, based on the weight of the polymer composition. In a further embodiment, the polymer composition does not comprise a propylene-based polymer.

In one embodiment, or a combination of embodiments described herein, the coating comprises ≤0.10 wt %, or ≤0.05 wt %, or ≤0.01 wt % of a polymer containing, in polymerized form, styrene, based on the weight of the coating. In a further embodiment, the coating does not comprise a polymer containing, in polymerized form, styrene. In one embodiment, or a combination of embodiments described herein, the polymer composition comprises ≤0.10 wt %, or ≤0.05 wt %, or ≤0.01 wt % of a polymer containing, in polymerized form, styrene, based on the weight of the polymer composition. In a further embodiment, the polymer composition does not comprise a polymer containing, in polymerized form, styrene.

In one embodiment, or a combination of embodiments described herein, the coating comprises ≤0.10 wt %, or ≤0.05 wt %, or ≤0.01 wt % of a fluoro-containing polymer, based on the weight of the coating. In a further embodiment, the coating does not comprise a fluoro-containing polymer. In one embodiment, or a combination of embodiments described herein, the polymer composition comprises ≤0.10 wt %, or ≤0.05 wt %, or ≤0.01 wt % of a fluoro-containing polymer, based on the weight of the polymer composition. In a further embodiment, the polymer composition does not comprise a fluoro-containing polymer.

In one embodiment, or a combination of embodiments described herein, the coating comprises ≤0.10 wt %, or ≤0.05 wt %, or ≤0.01 wt % of a polyurethane, based on the weight of the coating. In a further embodiment, the coating does not comprise a polyurethane. In one embodiment, or a combination of embodiments described herein, the polymer composition comprises ≤0.10 wt %, or ≤0.05 wt %, or ≤0.01 wt % of a polyurethane, based on the weight of the polymer composition. In a further embodiment, the polymer composition does not comprise a polyurethane.

In one embodiment, or a combination of embodiments described herein, the coating comprises ≤0.10 wt %, or ≤0.05 wt %, or ≤0.01 wt % of wax, based on the weight of the coating. In a further embodiment, the coating does not comprise a wax. In one embodiment, or a combination of embodiments described herein, the polymer composition comprises ≤0.10 wt %, or ≤0.05 wt %, or ≤0.01 wt % of wax, based on the weight of the polymer composition. In a further embodiment, the polymer composition does not comprise a wax. As used herein, the term "wax," refers to an ethylene-based polymer that has a melt viscosity, at 177° C., ≤5,000 cP, and is a solid at 23° C. and one atmosphere, or a propylene-based polymer that has a melt viscosity, at 230° C., ≤5,000 cP, and is a solid at 23° C. and one atmosphere, or a polysiloxane that has a melt viscosity, at 145° C., ≤5,000 cP, and is a solid at 23° C. and one atmosphere.

In one embodiment, or a combination of embodiments described herein, the olefin-based polymer is an ethylene-based polymer or a propylene-based polymer.

In one embodiment, or a combination of embodiments described herein, the olefin-based polymer is an ethylene-based polymer. In a further embodiment, the ethylene-based polymer has a melt index (I2) from 0.5 to 2000 g/10 min, or from 1.0 to 1000 g/10 min, or from 5.0 to 500 g/10 min, or from 10 to 100 g/10 min.

Examples of ethylene-based polymers include low density polyethylene (LDPE), high density polyethylene (HDPE), heterogeneously branched linear polymers (include Ziegler-Nana polymerized polymers, such as LLDPE, and include products such as DOWLEX Linear Low Density Polyethylene (LLDPE) available from The Dow Chemical Company), homogeneously branched substantially linear polymer (such as AFFINITY Polyolefin Plastomers and ENGAGE Polyolefin Elastomers, both available from The Dow Chemical Company) homogeneously branched linear polymers (such as EXACT Polymers available from ExxonMobil), olefin multiblock copolymers (such as INFUSE Olefin Block Copolymers available from The Dow Chemical Company), EPDM resins (such as NORDEL EPDM available from The Dow Chemical Company), and olefin block composites (such as INTUNE available from the Dow Chemical Company). Other examples of ethylene-based polymers include ethylene-based copolymers formed from high pressure, free-radical polymerizations. Examples polymers include SURLYN, BYNEL, ELVAX, NUCREL (DuPont) and DUTRAL (Versalis).

In one embodiment, or a combination of embodiments described herein, the olefin-based polymer is an ethylene/alpha-olefin interpolymer, and further an ethylene/alpha-olefin copolymer. Example alpha-olefins are those having from 3 to 8 carbon atoms, such as propylene, 1-butene, 1-pentene, 1-hexene, 1-heptene, and 1-octene.

In one embodiment, or a combination of embodiments described herein, the olefin-based polymer is a propylene-based polymer. In a further embodiment, the propylene-based polymer is a propylene/alpha-olefin interpolymer, and further a propylene/alpha-olefin copolymer, or a propylene/ethylene interpolymer, and further a propylene/ethylene copolymer. Example alpha-olefins include 1-butene, 1-pentene, 1-hexene, 1-heptene, and 1-octene. Propylene-based polymers include VERSIFY Polyolefin Elastomers available from the Dow Chemical Company, and VISTAMAXX polymers available from ExxonMobil.

In one embodiment, or a combination of embodiments described herein, the propylene-based polymer has a melt flow rate (MFR) from 0.5 to 2000 g/10 min, or from 1.0 to 1000 g/10 min, or from 5.0 to 500 g/10 min, or from 10 to 100 g/10 min.

In one embodiment, or a combination of embodiments described herein, the olefin-based polymer is selected from an ethylene/alpha-olefin/diene terpolymer or an ethylene/-alpha-olefin copolymer.

In one embodiment, or a combination of embodiments described herein, the olefin-based polymer is an ethylene/alpha-olefin/diene terpolymer, and further an EPDM. In a further embodiment, the diene is ENB.

In one embodiment, or a combination of embodiments described herein, the olefin-based polymer has a density from 0.850 to 0.940 g/cc, or from 0.855 to 0.935 g/cc, or from 0.860 to 0.930 g/cc, or from 0.865 to 0.925 g/cc (1 cc=1 cm$^3$). In a further embodiment, the olefin-based polymer is an ethylene/alpha-olefin/diene terpolymer, and further an EPDM. In a further embodiment, the diene is ENB.

In one embodiment, or a combination of embodiments described herein, the olefin-based polymer has a density from 0.850 to 0.880 g/cc, or from 0.855 to 0.875 g/cc, or from 0.858 to 0.870 g/cc. In a further embodiment, the olefin-based polymer is an ethylene/alpha-olefin/diene terpolymer, and further an EPDM. In a further embodiment, the diene is ENB.

In one embodiment, or a combination of embodiments described herein, the olefin-based polymer has a Mooney Viscosity (ML 1+4, 125° C.) from 10 to 100, or from 20 to 80, or from 30 to 60. In a further embodiment, the olefin-based polymer is an ethylene/alpha-olefin/diene terpolymer, and further an EPDM. In a further embodiment, the diene is ENB.

In one embodiment, or a combination of embodiments described herein, the olefin-based polymer comprises from 50 wt % to 65 wt %, or from 52 wt % to 62 wt %, of from 54 wt % 60 wt % of C2 (ASTM D3900), based on the weight of the interpolymer. In a further embodiment, the olefin-based polymer is an ethylene/alpha-olefin/diene terpolymer, and further an EPDM. In a further embodiment, the diene is ENB.

In one embodiment, or a combination of embodiments described herein, the olefin-based polymer has a percent crystallinity ≤50%, or ≤40%, or ≤30%, or ≤20%, or ≤10%, or ≤5.0%. In a further embodiment, the olefin-based polymer is an ethylene/alpha-olefin/diene terpolymer, and further an EPDM. In a further embodiment, the diene is ENB.

In one embodiment, or a combination of embodiments described herein, the olefin-based polymer has a percent crystallinity ≤10%, or ≤9.0%, or ≤8.0%, or ≤7.0%, or ≤6.0%, or ≤5.0%. In a further embodiment, the olefin-based polymer is an ethylene/alpha-olefin/diene terpolymer, and further an EPDM. In a further embodiment, the diene is ENB.

In one embodiment, or a combination of embodiments described herein, the olefin-based polymer has a molecular weight distribution (MWD) from 2.0 to 5.0, or from 2.0 to 4.5, or from 2.0 to 4.0, or from 2.0 to 4.5, or from 2.0 to 3.5, or from 2.0 to 3.0. In a further embodiment, the olefin-based polymer is an ethylene/alpha-olefin/diene terpolymer, and further an EPDM. In a further embodiment, the diene is ENB.

In one embodiment, or a combination of embodiments described herein, the polymer composition comprises ≥95 wt %, or ≥98 wt %, ≥ or 99 wt % of the olefin-based polymer, based on the weight of the polymer composition. In a further embodiment, the olefin-based polymer is an ethylene/alpha-olefin/diene terpolymer, and further an EPDM. In a further embodiment, the diene is ENB.

In one embodiment, or a combination of embodiments described herein, the olefin-based polymer is an ethylene/alpha-olefin inter-polymer, (for example, an EPDM), which has a density from 0.850 to 0.890 g/cc, or from 0.855 to 0.885 g/cc, or from 0.860 to 0.880 g/cc (1 cc=1 cm$^3$).

In one embodiment, or a combination of embodiments described herein, the olefin-based polymer is an ethylene/alpha-olefin interpolymer, which has a density from 0.850 to 0.890 g/cc, or from 0.855 to 0.885 g/cc, or from 0.860 to 0.880 g/cc (1 cc=1 cm$^3$). In a further embodiment, the ethylene/α-olefin interpolymer is an ethylene/α-olefin copolymer. Example alpha-olefins are those having from 3 to 8 carbon atoms, such as propylene, 1-butene, 1-pentene, 1-hexene, 1-heptene, and 1-octene.

In one embodiment, or a combination of embodiments described herein, the olefin-based polymer is an ethylene/alpha-olefin interpolymer, which has a melt index (I2, 190° C. and 2.16 kg) from 0.1 to 50 g/10 min, or from 0.5 to 40 g/10 min, or from 0.8 to 30 g/10 min. In a further embodiment, the interpolymer is an ethylene/α-olefin copolymer. Example alpha-olefins are those having from 3 to 8 carbon atoms, such as propylene, 1-butene, 1-pentene, 1-hexene, 1-heptene, and 1-octene.

In one embodiment, or a combination of embodiments described herein, the olefin-based polymer is an ethylene/alpha-olefin interpolymer, which has a melt index (I2, 190° C. and 2.16 kg) from 0.1 to 10 g/10 min, or from 0.5 to 8.0 g/10 min, or from 0.8 to 6.0 g/10 min. In a further embodiment, the interpolymer is an ethylene/α-olefin copolymer. Example alpha-olefins are those having from 3 to 8 carbon atoms, such as propylene, 1-butene, 1-pentene, 1-hexene, 1-heptene, and 1-octene.

In one embodiment, or a combination of embodiments described herein, the olefin-based polymer is an ethylene/alpha-olefin inter-polymer, which has a molecular weight distribution (MWD), from 1.7 to 3.5, or from 1.8 to 3.0, or from 1.8 to 2.8, or from 1.8 to 2.5. In a further embodiment, the interpolymer is an ethylene/α-olefin copolymer. Example alpha-olefins are those having from 3 to 8 carbon atoms, such as propylene, 1-butene, 1-pentene, 1-hexene, 1-heptene, and 1-octene.

In one embodiment, or a combination of embodiments described herein, the polymer particles comprise a coating on at least 50%, or at least 60%, or at least 70%, or at least 80% of the total surface of the polymer particles.

In one embodiment, or a combination of embodiments described herein, the polymer particles comprise a coating on at least 85%, or at least 90%, or at least 95%, of the total surface of the polymer particles. The total surface area of the polymer particles can be calculated from the average pellet dimensions of the particles (for example, pellets) and the weight of the particles per gram; or by a BET analysis (for example, using a BET instrument available from Micromeritics ASAP 2420). The amount of surface area of the polymer particles that has been coated can be determined by visual inspection, typically with the use of a magnifying glass.

In one embodiment, or a combination of embodiments described herein, the metal acid and the polysiloxane comprise ≥90 wt %, or ≥95 wt %, or ≥98 wt %, or ≥99 wt % of the total weight of the coating.

In one embodiment, or a combination of embodiments described herein, the coated polymer particles has an unconfined yield strength, at 0° C., ≤20 lb/ft$^2$, further ≤15 lb/ft$^2$, further ≤10 lb/ft$^2$, further ≤5.0 lb/ft$^2$, further ≤4.0 lb/ft$^2$, further ≤3.0 lb/ft$^2$, further ≤2.0 lb/ft$^2$, further ≤1.0 lb/ft$^2$, further ≤0.5 lb/ft$^2$, further ≤0.2 lb/ft$^2$, further ≤0.1 lb/ft$^2$.

The olefin-based polymer may comprise a combination of two or more embodiments described herein. The ethylene-based polymer may comprise a combination of two or more embodiments described herein. The propylene-based polymer may comprise a combination of two or more embodiments described herein.

For the first, second and third aspects, described above, also is provided are coated polymer particles formed from the respective process of one or more embodiments, as described herein. For the first, second and third aspects, described above, also is provided is a composition comprising coated polymer particles formed from the respective process of one or more embodiments, as described herein, and at least one additive. Additives include, but are not limited to, antioxidants, ultraviolet absorbers, antistatic agents, colorants (e.g., titanium dioxide, carbon black and pigments), flame retardants, and any combination thereof.

For the first, second and third aspects, described above, also is provided an article comprising at least one component formed from a composition comprising coated polymer particles formed from the respective process of one or more embodiments, as described herein.

For the fourth aspect, in one embodiment, or a combination of embodiments described herein, the composition comprises ≥95 wt %, or ≥98 wt %, or ≥99 wt % of the polymer particles, based on the weight of the composition.

For the fourth aspect, also is provided is an article comprising at least one component formed from the composition of more or more embodiments described herein. An inventive article may comprise a combination of two or more embodiments as described herein.

Polysiloxane Emulsion

An aqueous polysiloxane emulsion is a composition comprising water and a polysiloxane. A "polysiloxane" is a polymer that comprises the following repeat unit —(SiR1R2-O)$_n$—, where R1 and R2 are each, independently, a hydrocarbon or a substituted hydrocarbon, and n is greater than, or equal to, 2. As used herein the term "substituted hydrocarbon" refers to a hydrocarbon comprising at least one heteroatom (for example, O, N or P). In one embodiment, or a combination of embodiments described herein, R1 and R2 are each, independently, a hydrocarbon, and further an alkyl group.

In one embodiment, or a combination of embodiments described herein, R1 and/or R2 are/is selected from the following: an alkenyl group, such as, for example, a vinyl group, an allyl group, a butenyl group, a pentenyl group, or a hexenyl group, and preferably a vinyl group; and alkyl group, such as, for example, a methyl group, an ethyl group, a propyl group, a butyl group, a cyclopentyl group, or a cyclohexyl group, or similar cycloalkyl groups; and aryl group, such as, for example, a phenyl group, a tolyl group, a xylyl group, a benzyl group, a phenethyl group, a 3-phenylpropyl groups; an alkoxy group, such as, for example, a methoxy group or an ethoxy groups; a halogenated hydrocarbon group, such as, for example, a 3-chloropropyl group or a 3,3,3-trifluoropropyl group; or an oxime group, such as, for example, a dimethylketoxime group or a methylethylketoxime group.

In one embodiment, or a combination of embodiments described herein, the poly-siloxane is selected from polydimethylsiloxane (PDMS), methyltrimethoxysilane, vinyltrimethoxysilane, methyltrioximesilane or vinyltrioximesilane.

In one embodiment, or a combination of embodiments described herein, the poly-siloxane is selected from a dimethylpolysiloxanes having both molecular terminals capped with dimethylvinylsiloxy groups, a copolymer of methylvinylsiloxane and dimethylsiloxane having dimethylvinylsiloxy groups on both molecular terminals, a methylvinylpolysiloxane having trimethylsiloxy groups at both molecular terminals, or a cyclic methylvinylsiloxane.

In one embodiment, or a combination of embodiments described herein, the polysiloxane polymer has the structural formula —Si(R1R2)-O—, wherein the R1 and the R2 are each, independently a $C_1$-$C_{18}$ hydrocarbyl groups. In a further embodiment, R1 and the R2 are each, independently, selected from an aliphatic group and an aromatic group. In a further embodiment, each is selected from an aliphatic group, further an alkyl, further methyl.

In one embodiment, or a combination of embodiments described herein, the poly-siloxane has a viscosity, at 25° C., from 200 to 2000 cSt, or from 250 to 1800 cSt, or from 300 to 1600 cSt, or from 350 to 1200 cSt.

Polymer Particles

The term "polymer particles," are in reference to the particles that are coated as described herein. Typical polymer particles are generally substantially platelet, spherical, cylindrical, or rod shape. While the cross-sectional area may vary, depending upon the polymer, preferably, the cross-sectional area of a polymer particle is from $3 \times 10^{-3}$ square inch ($1.93 \times 10^{-2}$ square centimeters) to 0.2 square inch (1.29 square centimeters); that is from 1/16 inch (0.15875 cm) to 1/2 inch (1.27 cm) in diameter, if the cross-section is, for example, circular. In one embodiment, the particles have a cross-sectional area from 0.01 square inch ($6.45 \times 10^{-2}$ square centimeters) to 0.05 square inch (0.322 square centimeters); that is from 0.125 inch (0.3175 cm) to 0.375 inch (0.9525 cm) in diameter, if, for example, the cross-section is circular. In one embodiment, are particles are from 0.25 cm to 0.40 cm in diameter.

The polymer particles are in the form of particulate solids, ranging in size from powders to pellets. Pellets are particulate solids, and are generally, but not exclusively, formed through extrusion and pelletization processes, with a typical average particle size (average of the longest dimension)≥2 mm, typically from 2 mm to 10 mm, further from 2 mm to 6 mm, and further from 2 mm to 4 mm. Micropellets typically have an average particle size less than that of a standard pellet, yet greater than those average particle sizes produced from general commercial die capabilities. The average particle size of micropellets typically ranges from 200 microns to 2000 microns. The micropellets generally exhibit a semi-spheroidal shape.

In one embodiment, or a combination of embodiments described herein, the polymer particles are formed from a polymer composition comprising one ethylene/alpha-olefin interpolymer, or at least two ethylene/alpha-olefin interpolymers, which differ in one or more of the following properties: density, Mn, Mw, MWD, comonomer type and/or comonomer content. In one embodiment, or a combination of embodiments described herein, the polymer particles are formed from a polymer composition comprising one ethylene/alpha-olefin copolymer, or at least two ethylene/alpha-olefin copolymers, which differ in one or more of the following properties: density, Mn, Mw, MWD, comonomer type and/or comonomer content.

In one embodiment, or a combination of embodiments described herein, the polymer particles are formed from a polymer composition comprising one ethylene/alpha-olefin/diene interpolymer, or at least two ethylene/alpha-olefin/diene interpolymers, which differ in one or more of the following properties: density, Mn, Mw, MWD, comonomer type and/or comonomer content. In one embodiment, or a combination of embodiments described herein, the polymer particles are formed from a polymer composition comprising one EPDM, or at least two EPDMs, which differ in one or more of the following properties: density, Mn, Mw, MWD, comonomer type and/or comonomer content.

In one embodiment, or a combination of embodiments described herein, the polymer particles are formed from a polymer composition comprising an ethylene-based polymer, further an ethylene-based interpolymer, and further an ethylene-based copolymer.

The polymer particles may comprise a combination of two or more embodiments described herein. A polymer composition may comprise a combination of two or more embodiments as described herein.

Inventive Processes

In one embodiment, or a combination of embodiments described herein, the process of forming the coated polymer particles comprises contacting the polymer particles with the metal acid dispersion and polysiloxane emulsion. The polymer particles may be contacted with the metal acid dispersion, either before, after, or simultaneously with, the polysiloxane emulsion. In any event, both the polysiloxane emulsion and the metal acid dispersion should be contacted with the polymer particles, under conditions, such that the polymer particles can be sufficiently physically coated with the desired agent or agents.

In one embodiment, or a combination of embodiments described herein, such contacting is conducted by a first liquid feeding of part, or all, of the polysiloxane emulsion, onto the polymer particles, or immersing the polymer particles in part, or all, of the polysiloxane emulsion. The metal acid dispersion is then distributed onto the polymer particles that are pre-coated with the polysiloxane emulsion. The means of contacting and distributing may vary, so long as the polymer particles become sufficiently coated with the metal acid dispersion, such that the metal acid dispersion is adhered to the surface of the polymer particles. Usually, the process is sufficient, so long as the average amount of surface coating is ≥50 percent, and preferably ≥60 percent, or ≥80 percent, based on the total surface area of the polymer particles.

In one embodiment, the thickness of the coating is from 1.0 microns to 150 microns, or from 5.0 microns to 100 microns, or from 10 microns to 50 microns. This value may also be expressed in terms of percent increase in the average size of the polymer particles (for example, pellets). This percent increase is generally from 0.01 percent to 15 percent, depending on amount of metal acid dispersion, and the type of method used to apply, and process, the coating.

Examples of blending equipment/processes include any mechanical means of moving the polymer particles, such as, for example, a simple tumbling of a jar, or blending in a conical rotating vessel, ribbon blender, drum tumbler, paddle blender, agglomeration pan and fluidized bed operations. In one embodiment, the coating process includes the use of a pneumatic conveyor, under air or inert gas. Moderate stirring, shaking, or even a short distance of conveying in a screw conveyor, can be sufficient for such adequate distribution of the agent or agents. The type of contacting employed may be the same, or different, for the polysiloxane emulsion and the metal acid dispersion, if the polymer particles are contacted with the emulsion and the dispersion at separate times.

The contacting of the agents (polysiloxane emulsion and/or metal acid dispersion) and the polymer particles can be conducted at any temperature, at which an agent does not evaporate, solidify, become too viscous, or significantly react with the polymer particles. Such temperatures often vary, depending upon the components of the composition, but typically are from −10° C. to 150° C., further from 0° C. to 60° C., or from 5° C. to 35° C.

The coating composition may be spray coated on at least a portion of the surface of the polymer particles to form wet-coated polymer particles. Particles can be dried, for example, in a forced air and/or spin dryer.

Articles

The invention also provides an article comprising at least one component formed from an inventive composition. Articles include, but are not limited to, injection molded articles, thermoformed articles and foams. Additional articles include but are not limited to medical devices (e.g., pressure cuffs and stabilization devices); roofing membranes; inflatable articles (e.g., toys, watercraft, cushioning and furniture), sheetings (e.g., awnings, banners, signs, tents, tarpaulins, and liners for pools, ponds or landfills), book bindings, and carriers (e.g., sporting bags and backpacks). Additional articles include automotive parts.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, may be incorporated into and/or within a polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term, "olefin-based polymer," as used herein, refers to a polymer that comprises, in polymerized form, 50 wt % or a majority amount of olefin monomer, for example ethylene or propylene, (based on the weight of the polymer), and optionally may comprise one or more comonomers.

The term, "ethylene-based polymer," as used herein, refers to a polymer that comprises, in polymerized form, 50 wt % or a majority amount of ethylene monomer (based on the weight of the polymer), and optionally may comprise one or more comonomers.

The term "ethylene/α-olefin interpolymer," as used herein, refers to an interpolymer that comprises, in polymerized form, ethylene monomer (based on the weight of the interpolymer), and at least one α-olefin. In one embodiment, the "ethylene/α-olefin interpolymer," comprises, in polymerized form, 50 wt % or a majority amount of ethylene monomer, based on the weight of the interpolymer.

The term "ethylene/α-olefin/diene interpolymer," as used herein, refers to an inter-polymer that comprises, in polymerized form, ethylene monomer, an α-olefin, and a diene. Typically, the "ethylene/α-olefin/diene interpolymer," comprises, in polymerized form, 50 wt % or a majority amount of ethylene monomer, based on the weight of the interpolymer. A non-limiting example of the ethylene/α-olefin/diene interpolymer is EPDM (ethylene propylene diene monomer) or EPDM rubber, which is a terpolymer of ethylene, propylene and a diene component. Suitable dienes used in the manufacture of EPDM rubbers include but are not limited to dicyclopentadiene ("DCPD"), ethylidene norbornene ("ENB"), or vinyl norbornene ("VNB"). M class includes rubbers having saturated chain of the polymethylene type. EPDM rubber (ethylene propylene diene monomer (M-class)) rubber is an elastomer characterized by a wide range of applications. M class includes rubbers having saturated chain of the polymethylene type. A "diene" can be 1,4-hexadiene, 1,6-octadiene, 5-methyl-1,4-hexadiene, 3,7-dimethyl-1,6-octadiene, dicyclopentadiene (DCPD), norbornadiene, 5-vinyl-2-norbornene (VNB), ethylidene norbornene (ENB), and combinations thereof.

The term, "ethylene/α-olefin copolymer," as used herein, refers to a copolymer that comprises, in polymerized form, 50 wt % or a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The term "propylene/α-olefin interpolymer," as used herein, refers to an interpolymer that comprises, in polymerized form, a majority amount of propylene monomer (based on the weight of the interpolymer), and at least one α-olefin.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term "propylene/ethylene interpolymer," as used herein, refers to an interpolymer that comprises, in polymerized form, a majority amount of propylene monomer (based on the weight of the interpolymer), and at least ethylene.

The term, "propylene/ethylene copolymer," as used herein, refers to a copolymer that comprises, in polymerized form, a majority amount of propylene monomer (based on the weight of the copolymer), and ethylene, as the only two monomer types.

The term "aqueous metal acid dispersion," as used herein, refers to a composition comprising water and a metal acid. Such a composition may include further components, such as surfactants and other additives.

The term "metal acid," as used herein, refers to a composition comprising one or more metal fatty acids.

The term "fatty acid," as used herein, refers to a hydrocarbon chain containing a terminal carboxyl group. As understood in the art, the fatty acid will be in the anionic form (—C(O)O—). Preferred fatty acids include C12-C20 fatty acids, and further C14-C18 fatty acids, and further C16-C18 fatty acids.

The phrase "a portion of the surfaces of the polymer particles," as used herein, refers to ≥50% of the total surface of the polymer particles. The total surface of the polymer particles can be determined by BET as discussed above. In one embodiment, ≥60%, or ≥70%, or ≥80%, or ≥90% of the total surface of the polymer particles is coated, as described herein. The amount of surface area coated can be determined by visual inspection.

The phrase "drying the wet-coated polymer particles to form the coated polymer particles," and other similar phrases, as used herein, refer to removing the aqueous medium from the surface of the particles. The drying step can be monitored by taking a sample of coated pellets, and analyzing for moisture on the surface of the pellets using Computrac Vapor Pro XL Analyzer (Arizona Instruments). Pellets are heated at 200° C. for 10 minutes, and the presence of water is detected.

The term "dry coated polymer particles," and other similar terms, as used herein, refer to the coated polymer particles formed, after removing the aqueous medium from the surface of the particles.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Specific embodiments of the present disclosure include but are not limited to the following:

1. A process to form coated polymer particles, comprising polymer particles formed from a polymer composition comprising an olefin-based polymer, and a coating formed from a coating composition comprising an aqueous metal acid dispersion, and an aqueous polysiloxane emulsion, said process comprising the following:
   mixing together the aqueous metal acid dispersion and the aqueous polysiloxane emulsion to form a dispersion/emulsion mixture;
   applying the dispersion/emulsion mixture to a portion of the surfaces of polymer particles, to form wet-coated polymer particles;
   drying the wet-coated polymer particles to form the coated polymer particles.

2. A process to form coated polymer particles, comprising polymer particles formed from a polymer composition comprising an olefin-based polymer, and a coating formed from a coating composition comprising an aqueous metal acid dispersion, and an aqueous polysiloxane emulsion, said process comprising the following:
   mixing together the aqueous metal acid dispersion and the aqueous polysiloxane emulsion at a mixing ratio of the aqueous polysiloxane emulsion to the aqueous metal acid dispersion to form a dispersion/emulsion mixture, wherein the mixing ratio of the aqueous polysiloxane emulsion to the aqueous metal acid dispersion is from greater than or equal to 0.05 to less than or equal to 0.8, or from greater than or equal to 0.1 to less than or equal to 0.8, or from greater than or equal to 0.2 to less than or equal to 0.8, or from greater than or equal to 0.3 to less than or equal to 0.8, or from greater than or equal to 0.3 to less than or equal to 0.6, or from greater than or equal to 0.3 to less than or equal to 0.5;
   applying the dispersion/emulsion mixture to a portion of the surfaces of polymer particles, to form wet-coated polymer particles;
   drying the wet-coated polymer particles to form the coated polymer particles.

3. A process to form coated polymer particles, comprising polymer particles formed from a polymer composition comprising an olefin-based polymer, and a coating formed from a coating composition comprising an aqueous metal acid dispersion, and an aqueous polysiloxane emulsion, said process comprising the following:
   A) applying the aqueous polysiloxane emulsion to a portion of the surfaces of polymer particles to form emulsion-coated polymer particles;
   B) applying the aqueous metal acid dispersion to a portion of the surfaces of the emulsion-coated polymer particles to form dispersion-emulsion-coated polymer particles;
   C) drying the dispersion-emulsion-coated polymer particles to form the coated polymer particles; and
   wherein, optionally, the emulsion-coated polymer particles from step A are dried, before step B.

4. A process to form coated polymer particles comprising polymer particles formed from a polymer composition comprising an olefin-based polymer, and a coating formed from a coating composition comprising an aqueous metal acid dispersion, and an aqueous polysiloxane emulsion, said process comprising the following:
   A) applying the aqueous metal acid dispersion to a portion of the surfaces of polymer particles to form dispersion-coated polymer particles;

B) applying the aqueous polysiloxane emulsion to a portion of the surfaces of the dispersion-coated polymer particles to form emulsion-dispersion-coated polymer particles;

C) drying the emulsion-dispersion-coated polymer particles to form the coated polymer particles; and wherein, optionally, the dispersion-coated polymer particles from step A are dried, before step B.

5. The process of any one of the previous embodiments, wherein the metal of the metal acid is selected from calcium, zinc or barium.

6. The process of any one of the previous embodiments, wherein the metal acid comprises a metal stearate, and further a calcium stearate.

7. The process of any one of the previous embodiments, wherein the metal acid comprises a metal stearate, and further a calcium stearate, and a metal C16 fatty acid, and further a calcium C16 fatty acid.

8. The process of any one of the previous embodiments, wherein the weight ratio of the polysiloxane to the metal acid, in the coated polymer particles, is from 0.10 to 10.0, or from 0.20 to 10.0, or from 0.30 to 10.0, or from 0.35 to 9.0, or from 0.40 to 8.0, or from 0.45 to 7.0, or from 0.50 to 6.0, or from 0.55 to 6.0.

9. The process of any one of the previous embodiments, wherein the weight ratio of the polysiloxane to the metal acid, in the coated polymer particles, is from 0.10 to 10.0, and wherein the polysiloxane is present in an amount ≥20 ppm, based on the weight of the coated polymer particles.

10. The process of any one of the previous embodiments, wherein the metal acid is present in an amount from greater than zero to 5000 ppm, based on the weight of the coated polymer particles.

11. The process of any one of the previous embodiments, wherein the metal acid is present in an amount from 2 ppm to 5000 ppm, or from 2 ppm to 4000 ppm, or from 2 ppm to 3000 ppm, or from 2 ppm to 2000 ppm, or from 2 ppm to 1000 ppm, or from 2 ppm to 950 ppm, or from 2 ppm to 900 ppm, or from 2 ppm to 850 ppm, or from 2 ppm to 800 ppm, based on the weight of the coated polymer particles.

12. The process of any one of the previous embodiments, wherein the polysiloxane is present in an amount from 20 ppm to 500 ppm, or from 20 ppm to 300 ppm, or from 30 ppm to 300 ppm, or from 40 ppm to 300 ppm, or from 50 ppm to 300 ppm, based on the weight of the coated polymer particles.

13. The process of any one of the previous embodiments, wherein the metal acid is calcium stearate.

14. The process of any one of the previous embodiments, wherein the metal acid is mixture of calcium stearate (C18) and calcium palmitate (C16).

15. The process of any one of the previous embodiments, wherein the polysiloxane is polydimethylsiloxane (PDMS).

16. The process of any one of embodiments 1, 2 or 5-15, wherein the dispersion/emulsion mixture is added to pelletization water, and wherein the polymer particles are added to the pelletization water.

17. The process of any one of embodiments 2 or 5-15, wherein the aqueous metal acid dispersion or the aqueous polysiloxane emulsion is added to pelletization water, and wherein the polymer particles are added to the pelletization water.

18. The process of any one of embodiments 3 or 5-15, wherein the aqueous polysiloxane emulsion or the aqueous metal acid dispersion is added to pelletization water, and wherein the polymer particles are added to the pelletization water.

19. The process of any one of the previous embodiments, wherein the coating composition is not crosslinked.

20. The process of any one of the previous embodiments, wherein the polymer particles are in the form of pellets.

21. The process of any one of the previous embodiments, wherein the coating comprises ≤0.10 wt % of an amide-containing compound or an amide-containing polymer, each based on the weight of the coating.

22. The process of any one of the previous embodiments, wherein the polymer composition comprises ≤0.10 wt % of an amide-containing compound or an amide-containing polymer, each based on the weight of the polymer composition.

23. The process of any one of the previous embodiments, wherein the coating comprises ≤0.10 wt % of wax, based on the weight of the coating.

24. The process of any one of the previous embodiments, wherein the polymer composition comprises ≤0.10 wt % of wax, based on the weight of the polymer composition.

25. The process of any one of the previous embodiments, wherein the olefin-based polymer is an ethylene-based polymer or a propylene-based polymer.

26. The process of embodiment 25, wherein the olefin-based polymer is an ethylene-based polymer.

27. The process of embodiment 26, wherein the ethylene-based polymer is an ethylene/alpha-olefin interpolymer, and further an ethylene/alpha-olefin copolymer.

28. The process of embodiment 25, wherein the olefin-based polymer is a propylene-based polymer.

29. The process of embodiment 28, wherein the propylene-based polymer is a propylene/alpha-olefin interpolymer, and further a propylene/alpha-olefin copolymer, or a propylene/ethylene interpolymer, and further a propylene/ethylene copolymer 30. The process of any one of embodiments 1-24, wherein the olefin-based polymer is an ethylene/alpha-olefin/diene terpolymer, and further an EPDM.

31. The process of any one of the previous embodiments, wherein the olefin-based polymer has a density from 0.850 to 0.940 g/cc.

32. The process of any one of the previous embodiments, wherein the olefin-based polymer has a density from 0.850 to 0.880 g/cc.

33. The process of any one of the previous embodiments, wherein the olefin-based polymer has a Mooney Viscosity (ML 1+4, 125° C.) from 10 to 100.

34. The process of any one of the previous embodiments, wherein the olefin-based polymer has a percent crystallinity≤50%, or ≤40%, or ≤30%, or ≤20%, or ≤10%, or ≤5.0%.

35. The process of any one of the previous embodiments, wherein the olefin-based polymer has a molecular weight distribution (MWD) from 2.0 to 5.0.

36. The process of any one of the previous embodiments, wherein the polymer composition comprises ≥95 wt %, or ≥98 wt %, or ≥99 wt % of the olefin-based polymer, based on the weight of the polymer composition.

37. Coated polymer particles formed from the process of any one of the previous embodiments.

38. A composition comprising the coated polymer particles of embodiment 37, and at least one additive.

39. An article comprising at least one component formed from the composition of embodiment 38.

40. A composition comprising dry coated polymer particles, which comprise polymer particles formed from a polymer composition comprising an olefin-based polymer, and a coating formed from a coating composition comprising an aqueous metal acid dispersion, and an aqueous polysiloxane emulsion; and
wherein the metal acid is present in an amount from greater than zero to 5000 ppm, based on the weight of the dry coated polymer particles; and
wherein the polysiloxane is present in an amount from greater than zero to 500 ppm, based on the weight of the dry coated polymer particles.

41. The composition of embodiment 40, wherein the weight ratio of the polysiloxane to the metal acid, on the dry coated polymer particles, is from 0.10 to 10.0, or from 0.20 to 10.0, or from 0.30 to 10.0, or from 0.35 to 9.0, or from 0.40 to 8.0, or from 0.45 to 7.0, or from 0.50 to 6.0, or from 0.55 to 6.0.

42. The composition of embodiment 40 or 41, wherein the metal acid is present in an amount from 2 ppm to 5000 ppm, or from 2 ppm to 4000 ppm, or from 2 ppm to 3000 ppm, or from 2 ppm to 2000 ppm, or from 2 ppm to 1000 ppm, or from 2 ppm to 950 ppm, or from 2 ppm to 900 ppm, or from 2 ppm to 850 ppm, or from 2 ppm to 800 ppm, based on the weight of the dry coated polymer particles.

43. The composition of any one of embodiments 40-42, wherein the polysiloxane is present in an amount from 20 ppm to 500 ppm, or from 20 ppm to 300 ppm, or from 30 ppm to 300 ppm, or from 40 ppm to 300 ppm, or from 50 ppm to 300 ppm, based on the weight of the dry coated polymer particles.

44. The composition of any one of embodiments 40-43, wherein the metal acid comprises calcium stearate.

45. The composition of any one of embodiments 40-44, wherein the metal acid is mixture of calcium stearate (C18) and calcium palmitate (C16).

46. The composition of any one of embodiments 40-45, wherein the polysiloxane is polydimethylsiloxane (PDMS).

47. The composition of any one of embodiments 40-46, wherein the coating is not crosslinked.

48. The composition of any one of embodiments 40-47, wherein the polymer particles are in the form of pellets.

49. The composition of any one of embodiments 40-48, wherein the coating comprises ≤0.10 wt % of an amide-containing compound or an amide-containing polymer, each based on the weight of the coating.

50. The composition of any one of embodiments 40-49, wherein the coating comprises ≤0.10 wt % of wax, based on the weight of the coating.

51. The composition of any one of embodiments 40-50, wherein the olefin-based polymer is an ethylene-based polymer or a propylene-based polymer.

52. The composition of embodiment 51, wherein the olefin-based polymer is an ethylene-based polymer.

53. The composition of embodiment 52, wherein the ethylene-based polymer is an ethylene/alpha-olefin interpolymer, and further an ethylene/alpha-olefin copolymer.

54. The composition of embodiment 51, wherein the olefin-based polymer is a propylene-based polymer.

55. The composition of embodiment 54, wherein the propylene-based polymer is a propylene/alpha-olefin interpolymer, and further a propylene/alpha-olefin copolymer, or a propylene/ethylene interpolymer, and further a propylene/ethylene copolymer 56. The composition of any one of embodiments 40-50, wherein the olefin-based polymer is an ethylene/alpha-olefin/diene terpolymer, and further an EPDM.

57. The composition of any one of embodiments 40-56, wherein the olefin-based polymer has a density from 0.850 to 0.940 g/cc, or from 0.850 to 0.900 g/cc, or from 0.850 to 0.880 g/cc.

58. The composition of any one of embodiments 40-57, wherein the olefin-based polymer has a Mooney Viscosity (ML 1+4, 125° C.) from 10 to 100.

59. The composition of any one of embodiments 40-58, wherein the polymer composition comprises ≥95 wt %, or ≥98 wt %, or ≥99 wt % of the olefin-based polymer, based on the weight of the polymer composition.

60. The composition of any one of embodiments 40-59, wherein the composition comprises greater than 95 wt %, or 98 wt %, or 99 wt % of the polymer particles, based on the weight of the composition.

61. An article comprising at least one component formed from the composition of any one of embodiments 40-60.

Test Methods

Density is measured according ASTM D792, except for EPDM and similar terpolymers, then density is measured according to ASTM D297.

Melt index ($I_2$) of an ethylene-based polymer is measured at 190° C., under a load of 2.16 kg, according to ASTM D-1238. Melt index ($I_5$) is measured at 190° C., under a load of 5 kg, according to ASTM D-1238. Melt index ($I_{10}$) is measured at 190° C., under a load of 10 kg, according to ASTM D-1238. Melt index ($I_{21}$) is measured at 190° C., under a load of 21.6 kg, according to ASTM D-1238. The melt flow rate (MFR) of a propylene-based polymer is measured in accordance with ASTM D-1238, condition 230° C./2.16 kg.

Mooney Viscosity

Mooney Viscosity (ML1+4 at 125° C.) was measured in accordance with ASTM 1646, with a one minute preheat time and a four minute rotor operation time. The instrument is an Alpha Technologies Mooney Viscometer 2000.

GPC Molecular Weight and Molecular Weight Distribution

Molecular weight is determined using gel permeation chromatography (GPC) on a Waters 150° C. high temperature chromatographic unit, equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min, and the injection size is 100 microliters. The molecular weight determination is deduced by using narrow molecular weight distribution polystyrene standards (from Polymer Laboratories), in conjunction with their elution volumes. The equivalent polyethylene molecular weights are determined by using appropriate Mark-Houwink coefficients for polyethylene and polystyrene (as described by T. Williams & I. M. Ward, *The Construction of a Polyethylene Calibration Curve for Gel Permeation Chromatography Using Polystyrene Fractions,* 6 J. Polymer Sci. Pt. B: Polymer Letter 621, 621-624 (1968)) to derive the following equation:

$$M_{polyethylene} = a \times (M_{polystyrene})^b.$$

In this equation, $a=0.4316$ and $b=1.0$.

Number average molecular weight, $M_n$, of a polymer is expressed as the first moment of a plot of the number of molecules, in each molecular weight range, against the molecular weight. In effect, this is the total molecular weight of all molecules, divided by the number of molecules, and is calculated in the usual matter according to the following formula:

$$M_n = \sum n_i \times \frac{M_i}{\sum n_i} = \frac{\sum w_i}{\sum \left(\frac{w_i}{M_i}\right)},$$

where
$n_i$=number of molecules with molecular weight $M_i$
$w_i$=weight fraction of material having molecular weight $M_i$
and $\Sigma n_i$=total number of molecules.

Weight average molecular weight, $M_w$, is calculated in the usual manner according to the following formula: $M_w=\Sigma w_i \times M_i$, where $w_i$ and $M_i$ are the weight fraction and molecular weight, respectively, of the $i^{th}$ fraction eluting from the GPC column. The ratio of these two averages, the molecular weight distribution (MWD or $M_w/M_n$), defines the breadth of the molecular weight distribution.

DSC Method

Differential Scanning calorimetry (DSC) is used to measure crystallinity in ethylene-based polymers (PE, or OBC) samples and propylene-based polymer (PP) samples. About five to eight milligrams of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for ethylene-based polymer samples (230° C. for propylene-based polymer samples). The sample is kept at this temperature for three minutes. Then the sample is cooled at a rate of 10° C./min to −60° C. for ethylene-based polymer samples (−40° C. for propylene-based polymer samples), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for ethylene-based polymer samples (165 J/g, for propylene-based polymer samples), and multiplying this quantity by 100 (e.g., for ethylene-based polymer samples, % cryst.=($H_f$/292 J/g)×100; and for propylene-based polymer samples, % cryst.=($H_f$/165 J/g)×100).

Unless otherwise stated, melting point(s) ($T_m$) of each polymer is determined from the second heat curve obtained from DSC, as described above (peak $T_m$). The crystallization temperature ($T_c$) is determined from the first cooling curve (peak $T_c$).

The following examples illustrate the present invention but are not intended to limit the scope of the invention.

EXAMPLES

I. Materials

Polymer: NORDEL3640 EPDM, MV (ML1+4, 125° C.)=40, 55 wt % C2, 1.8 wt % ENB, density=0.86 g/cc, available from The Dow Chemical Company.

Polymer: NORDEL 4640 EPDM, MV (ML1+4, 125° C.)=40, 55 wt % C2, 4.9 wt % ENB, density=0.86 g/cc, available from The Dow Chemical Company.

Polymer: NORDEL 3745 EPDM, MV (ML1+4, 125° C.)=45, 70 wt % C2, 0.5 wt % ENB, density=0.88 g/cc, available from The Dow Chemical Company.

Polymer: NORDEL 4770 EPDM, MV (ML1+4, 125° C.)=70, 55 wt % C2, 4.9 wt % ENB, density=0.88 g/cc, available from The Dow Chemical Company.

Polymer: NORDEL 4520 EPDM, MV (ML1+4, 125° C.)=20, 50 wt % C2, 4.9 wt % ENB, density=0.86 g/cc, available from The Dow Chemical Company.

Aqueous Calcium Acid Dispersion: SUNKOTE 452 BF available from OMNOVA.

Aqueous Calcium Acid (C16 and C18 fatty acids) Dispersion: CHRISCOAT 50EF-SD628) available from GOVI.

Aqueous Calcium Acid Dispersion: Calcium Stearate Dispersion SYNPRO CW-1250 from Valtris Specialties Chemicals.

Aqueous PDMS Emulsion: XIAMETER MEM-0024 Emulsion available from Dow Corning (or Dow Performance Silicones).

Talc MP 10-52 available from Specialty Minerals.

COATHYLENE HA 2454, available from Clariant.

II. Coating Composition (Mixture of Dispersion and Emulsion)

The aqueous PDMS emulsion and aqueous metal acid dispersion were mixed in a stirred vessel, and further diluted with water to reduce the viscosity for ease of application. The ratio of two components (emulsion and dispersion) is determined by the target concentration of PDMS and metal acid on the pellets on dry basis. The excess water is removed from the surface of the pellets during the drying process. The pH of the mixture must be controlled during the mixing process to prevent instability of Calcium Stearate dispersion which may result in paste or lump formation.

Dilution of dispersion and subsequent mixture can result in suspension instability, which can cause formation of paste, clumps and agglomerates. This can be mitigated by modifying the formulation with excess surfactant, or by reducing the shelf-life of diluted mixture, or by keeping the mixture in constant state of agitation. It is beneficial, when the two components (emulsion and dispersion) are independently applied or admixed or diluted, just prior to application (e.g., spraying).

Case 1A

A preferred mixing ratio of the two components (PDMS emulsion and metal acid dispersion) for the dispersion/emulsion mixture is determined as follows. Stock mixtures were prepared at prescribed mixing ratios of aqueous PDMS emulsion to aqueous metal acid dispersion of 0.3, 0.4, 0.6, and 0.8. For example, for the mixing ratio of aqueous PDMS emulsion to aqueous metal acid dispersion of 0.4, a 500 mL stock mixture was prepared by adding 356 gm of CHRISCOAT 50EF-SD628 and 144 gm of XIAMETER MEM-0024 to a 1 liter jar followed by shaking of the jar for at least 15 seconds. Stock mixtures of the mixing ratios of aqueous PDMS emulsion to aqueous metal acid dispersion of 0.3, 0.6, and 0.8 were prepared in a similar manner.

Using the stock mixtures prepared, several 100 mL sample jars were filled and then stored at three different temperatures without disruption during storage. The sample jars were then observed for sedimentation at different time intervals as follows. Each sample jar was turned upside down. If the bottom of the jar was clear (no sediments), the mixture was deemed stable. If there were sediments at the bottom of the jar, the mixture was deemed unstable. The results of this study are provided in Table 1A.

TABLE 1A

| Mixture Ratio | 60 min | | | 1 day | | | 3 day | | | 1 month | | |
|---|---|---|---|---|---|---|---|---|---|---|---|---|
| | 4° C. | 21° C. | 37° C. | 4° C. | 21° C. | 37° C. | 4° C. | 21° C. | 37° C. | 4° C. | 21° C. | 37° C. |
| 0.3 | Stable | Stable | Stable | Stable | Stable | Stable | Stable | Stable | Stable | Stable | Stable | Stable |
| 0.4 | Stable | Stable | Stable | Stable | Stable | Stable | Stable | Stable | Stable | Stable | Stable | Stable |
| 0.6 | Stable | Stable | Stable | Stable | Stable | Stable | Stable | Stable | Stable | Stable | Stable | Stable |
| 0.8 | | Stable | | | Not Stable | | | Not Stable | | | Not Stable | |

III. Coating of Polymer Pellets

Amount of coating composition applied to the pellets. Determine the amount of pellets. The coated pellets are prepared using the following steps:
 a. Application of aqueous formulation or components
 b. Drying
 c. Cooling (optional)

The amount of PDMS emulsion and Calcium Acid dispersion required to achieve a target coating level can be determined as follows:

Amount of pellets to be coated, kg=W; Solids concentration in Calcium Acid Dispersion, %=C PDMS concentration in emulsion, %=P; Target concentration of PDMS on pellet surface on dry basis, ppm=p; Target concentration of Ca Acid on pellet surface on dry basis, ppm=c.

$W_D$=Required amount of Ca Acid dispersion, kg=(c·W)/C×$10^{-4}$

WE=Required amount of PDMS emulsion, kg=(p·W)/P×$10^{-4}$

Water is removed during the drying step.

Conversely, the coating level on pellets (dry basis) can be calculated from the amount of dispersion and emulsion applied to the pellets. c=CWD/W×$10^4$ and p=PW$_E$/W×$10^4$.

IV. Improvement in Handling Performance and Blocking Test

Measurement of Improvement In Handling Performance. The improvement in handling performance of coated polymer particles was observed during the manufacturing process, and later after the coated particles were subjected to the external factors of temperature and stress during shipment and storage until final consumption. The improvement in handling performance during manufacturing process can be measured by the following: Short Term Blocking Test (STBT) and Hopper Simulation Blocking Test (HSBT).

Short Term Blocking Test (STBT):

A sufficient amount of coated pellets (inventive or comparative composition) was loaded into a 2" diameter (ID) cylinder, with a height to diameter ratio of 2.5, such that the level of coated pellets was flush with the top of the cylinder (typically 100-120 grams coated pellets). The cylinder was made up of two halves held together, in the vertical dimension, by a hose clamp. The pellets were subjected to a consolidation stress of 80 lb/ft² at 21° C. The pellets remained under this consolidated stress for 5 or 10 minutes, depending on the product grade. The consolidation load was removed. The cylinder was placed on the platform of an INSTRON test machine. The two halves of the split cylinder were separated, after removing the hose clamp. If the pellets in the consolidated sample were totally free-flowing, the pellets will not hold the form of a cylinder, and will simply collect into a pile. If the consolidated mass of pellets does hold the form of a cylinder, an INSTRON machine was used to measure the maximum force required to crush the cylinder. The consolidated pellets were crushed using an INSTRON 5543 frame, to measure the maximum force required to break the "cylinder form" of the consolidated pellets. The consolidated pellets were positioned in the INSTRON in the vertical direction—longer dimension is the vertical direction. A constant strain rate of 18 mm/min was used for this test. To ensure data consistency, each composition (coated pellets) was measured twice, and the average reported.

The unconfined yield strength (UYS) was calculated as follows: UYS=Peak force/cross-section area of cylinder. The UYS is an indication of blocking force (the greater the unconfined yield strength, the greater the blocking force). A zero value corresponds to free-flowing pellets. Unconfined Yield Strength values less than 10 lb/ft² can be considered essentially free-flowing.

Hopper Simulation Blocking Tester Method:

The Hopper Simulation Blocking Tester (HSBT) consisted of a vessel with cylindrical section (12 inches diameter, 24 inches tall) and conical section attached to the bottom. The cone was made of smooth high density polyethylene (HDPE) with an outlet size of 9 inches and cone angle (from horizontal) of 80 degrees to assure mass-flow pattern. Coated pellets (25 kg) were loaded into the tester with the discharge outlet closed. The pellets were allowed to consolidate for a given time (30 seconds to 10 minutes). The maximum amount of time, after which the pellets can be successfully and completely discharged is indicative of the flowability of the pellets. Coated pellets that fail to discharge (block) at shorter consolidation time are deemed to have inferior handling characteristics than those which flow free-flowing out of the hopper. Similarly, the time duration required for complete discharge also provides a quantitative measure of flowability of the pellets.

Long Term Blocking Test (LTBT):

Semi-crystalline polymer pellets (or granules) are commonly packaged in bags, boxes, supersacks or bulk containers. In each of these shipping modes (packaging), the pellets are subjected to a history of temperature and stress conditions during shipment and storage. The long term blocking test (LTBT) was devised to emulate the worst case time, temperature and stress conditions experienced by the product during shipment and storage.

A sufficient amount of coated pellets (inventive or comparative composition) was loaded into a 2" diameter (ID) cylinder, with a height to diameter ratio of 2.5, such that the level of coated pellets was flush with the top of the cylinder (typically 100-120 grams coated pellets). The cylinder was made up of two halves held together, in the vertical dimension, by a hose clamp. The pellets were subjected to a consolidation stress of 195 lb/ft² (equivalent to stress at the bottom of a typical pallet of bags) at 37° C. The pellets remained under this consolidated stress for at least four weeks. This consolidation emulates condition experienced by the pellets at the bottom of a pallet during "Summer" conditions. At least four such cylinders are setup for each coated formulation.

After the said time, the consolidation loads are removed. Two cells at moved to 21 deg. C. oven whereas the remaining two cells are placed in a freezer at 0 deg C., and allowed to equilibrate for 12 hours. This corresponds to the "Winter" conditions during unloading of pallet. Polymer pellets subjected to such a temperature history are known to exhibit the highest blocking behavior. Thereafter, each of the cylinder was placed on the platform of an INSTRON test machine. The two halves of the split cylinder were separated, after removing the hose clamp. If the pellets in the consolidated sample were totally free-flowing, the pellets will not hold the form of a cylinder, and will simply collect into a pile. If the consolidated mass of pellets does hold the form of a cylinder, an INSTRON machine was used to measure the maximum force required to crush the cylinder. The consolidated pellets were crushed using an INSTRON 5543 frame, to measure the maximum force required to break the "cylinder form" of the consolidated pellets. The consolidated pellets were positioned in the INSTRON in the vertical direction— longer dimension is the vertical direction. A constant strain rate of 2 mm/min was used for this test. To ensure data consistency, each composition (coated pellets) was measured twice, and the average reported. The unconfined yield strength (UYS) was calculated as follows: UYS=Peak force/cross-section area of cylinder. The UYS is an indication of blocking force (the greater the unconfined yield strength, the greater the blocking force). A zero value corresponds to free-flowing pellets.

Study 1: Application of Mixture of PDMS Emulsion and Metal Acid Dispersion

Case 1

Uncoated pellets (25 kg) were sampled directly from outlet of the Spin Dryer and tumbled in a coating drum. A coating formulation comprising of PDMS emulsion and Ca Acid dispersion mixture was sprayed directly on the tumbling pellets. The pellets were mixed for additional two minutes before being discharged. The coated pellets were immediately tested for handling characteristics using the Hopper Simulation Blocking Tester (HSBT)—Table 1. Samples of wet coated product (pellets) were then tested for blocking strength using (STBT), and re-tested after drying at room temperature. See Table 2.

TABLE 1

Effect of coating level on product flowability based on HSBT

| Coating Composition On Pellets (dry basis) | | Flowability After 5 minutes consolidation | Total Time To Discharge, seconds |
|---|---|---|---|
| NORDEL 4640 | 100 ppm Metal Acid (no PDMS) | No Flow | — |
| NORDEL 4640 | 15 ppm metal acid + 5 ppm PDMS (Pre-mix) | No Flow | — |
| NORDE 4640 | 30 ppm Metal Acid + 10 ppm PDMS (Pre-mix) | No Flow | — |
| NORDEL 4640 | 60 ppm Metal Acid + 20 ppm PDMS (Pre-mix) | Complete Discharge | 77 |
| NORDEL 4640 | 100 ppm Metal Acid + 30 ppm PDMS (Pre-mix) | Complete Discharge | 13 |
| NORDEL 4640 | 30 ppm PDMS + 100 ppm Metal Acid (Sequence) | Complete Discharge | 40 |
| NORDEL 4640 | 100 ppm Metal Acid + 30 ppm PDMS (Sequence) | Complete Discharge | 76 |

Each ppm based on the weight of the dry coated pellets. Each Metal Acid = CHRISCOAT 50EF-SD628

TABLE 2

Effect of coating level and sequence of component addition on blocking (STBT)

| Coating Composition On Pellets (dry basis) | | Application Mode | Flowability After 5 minutes consolidation | Total Time To Discharge, seconds |
|---|---|---|---|---|
| NORDEL 4640 | 100 ppm Metal Acid (no PDMS) | Dispersion | No Flow | — |
| NORDEL 4640 | 15 ppm Metal Acid + 5 ppm PDMS (Pre-mix) | Dispersion- Emulsion Mixture | No Flow | — |
| NORDEL 4640 | 30 ppm Metal Acid + 10 ppm PDMS (Pre-mix) | Dispersion- Emulsion Mixture | No Flow | — |
| NORDEL 4640 | 60 ppm Metal Acid + 20 ppm PDMS (Pre-mix) | Dispersion- Emulsion Mixture | Complete Discharge | 77 |
| NORDEL 4640 | 100 ppm Metal Acid + 30 ppm PDMS (Pre-mix) | Dispersion- Emulsion Mixture | Complete Discharge | 13 |
| NORDEL 4640 | 30 ppm PDMS + 100 ppm Metal Acid (Sequence) | First PDMS Emulsion then Ca Acid Dispersion | Complete Discharge | 40 |
| NORDEL 4640 | 100 ppm Metal Acid + 30 ppm PDMS (Sequence) | First Ca Acid Dispersion then PDMS Emulsion | Complete Discharge | 76 |

Each ppm based on the weight of the dry coated pellets. Each Metal Acid = CHRISCOAT 50EF-SD628.

Case 2

Polymer pellets were sprayed with a mixture of PDMS emulsion and Ca acid dispersion on a moving bed of pellets. The wet pellets were mixed by the tumbling action of the conveyor and subsequent dryer. The dry coated product was sampled downstream of the dryer, and tested for improved flowability using HSBT approach. See Table 3.

TABLE 3

Improvement in handling performance measured with HSBT

| | Coating Composition On Pellets (dry basis) | Consolidation Time, minutes | Observation |
|---|---|---|---|
| NORDEL 4640 | 200 ppm PDMS | 2 | Blocked |
| NORDEL 4640 | 200 ppm PDMS | 5 | Blocked |
| NORDEL 4640 | 200 ppm PDMS and 100 ppm Metal Acid | 2 | Free-flowing |
| NORDEL 4640 | 200 ppm PDMS and 100 ppm Metal Acid | 5 | Free-flowing |
| NORDEL 3640 | 200 ppm PDMS | 5 | Blocked |
| NORDEL 3640 | 200 ppm PDMS and 30 ppm Metal Acid | 5 | Blocked |

TABLE 3-continued

Improvement in handling performance measured with HSBT

| | Coating Composition On Pellets (dry basis) | Consolidation Time, minutes | Observation |
|---|---|---|---|
| NORDEL 3640 | 200 ppm PDMS and 70 ppm Metal Acid | 5 | Free-flowing |
| NORDEL 3640 | 200 ppm PDMS and 100 ppm Metal Acid | 5 | Free-flowing |
| NORDEL 4570 | 200 ppm PDMS and 70 ppm Metal Acid | 5 | Free-flowing |
| NORDEL 4570 | 200 ppm PDMS and 70 ppm Metal Acid | 10 | Free-flowing |

Each ppm based on the weight of the dry coated pellets. Each Metal Acid = CHRISCOAT 50EF-SD628

Case 3

Uncoated pellets (25 kg) were sampled directly from outlet of the Spin Dryer and tumbled in a coating drum. A coating formulation comprising the PDMS emulsion and the Ca Acid dispersion mixture was sprayed directly on the tumbling pellets. The pellets were mixed for additional two minutes before being discharged. The coated pellets were immediately tested for handling characteristics using the Hopper Simulation Blocking Tester (HSBT)—Table 4. Samples of wet coated product (pellets) were then tested for blocking strength using (STBT), and re-tested after drying at room temperature.

TABLE 4

Improvement in handling characteristics measured using HSBT

| Product | Coating Composition on Pellets (dry basis) | Flowability in HSBT after 2 min consolidation |
|---|---|---|
| NORDEL 4520 | 150 ppm PDMS | Blocked |
| NORDEL 4520 | 15 ppm PDMS + 50 ppm Metal acid | Blocked |
| NORDEL 4520 | 30 ppm PDMS + 100 ppm Metal acid | Free-flowing |
| NORDEL 4520 | 45 ppm PDMS + 150 ppm Metal acid | Free-Flowing |

Each ppm based on the weight of the dry coated pellets. Each Metal Acid = CHRISCOAT 50EF-SD628

Study 2: Ca Acid Dispersion OR Mixture of PDMS Emulsion+Ca Acid Dispersion to Pellets Pre-Coated with PDMS Emulsion Case 1

Polymer pellets were sprayed with PDMS emulsion on a moving bed of pellets. The wet pellets were mixed by the tumbling action of the conveyor and subsequent dryer. The PDMS coated pellets were sampled at the outlet of the dryer and loaded into a tumbling mixer. A coating formulation, comprising the Ca Acid dispersion, was sprayed directly on the tumbling pellets. The pellets were mixed for additional two minutes, before being discharged. The coated pellets were immediately tested for handling characteristics using the Hopper Simulation Blocking Tester (HSBT). The results are summarized in Table 5.

Case 2

Polymer pellets (NORDEL 3640) were sprayed with the PDMS emulsion on a moving bed of pellets. The wet pellets were mixed by the tumbling action of the conveyor and subsequent dryer. The PDMS coated pellets were sampled at the outlet of the dryer, and loaded into a tumbling mixer. A coating formulation comprising of Ca Acid dispersion, or a mixture of PDMS emulsion and Ca Acid dispersion, was sprayed directly on the tumbling pellets. The pellets were mixed for additional two minutes, before being discharged. The coated pellets were immediately tested for handling characteristics using the Short Term Blocking Test (STBT). The results are summarized in Table 6.

TABLE 5

Comparison of different commercial grades of Calcium Acid Dispersion improvement in handling performance as measured with HSBT

| Polymer | Coating Composition on Pellets (dry basis) | Consolidation Time, minutes | Discharge Observation Flow/No-Flow |
|---|---|---|---|
| 3640 | 150 ppm PDMS | 0.5 | No-Flow |
| 3640 | 150 ppm PDMS + 150 ppm Ca Acid (SUNKOTE 452 BF) | 5 | Flow |
| 3640 | 150 ppm PDMS + 250 ppm Ca Acid (SUNKOTE 452 BF) | 5 | Flow |
| 3640 | 150 ppm PDMS + 150 ppm Ca Acid (CHRISCOAT 50EF-SD628) | 5 | Flow |
| 3640 | 150 ppm PDMS + 250 ppm Ca Acid (CHRISCOAT 50EF-SD628) | 5 | Flow |
| 3640 | 150 ppm PDMS + 150 ppm Ca Acid (SYNPRO CW-1250) | 5 | Flow |
| 3640 | 150 ppm PDMS + 250 ppm Ca Acid (SYNPRO CW-1250) | 5 | Flow |
| 4640 | 150 ppm PDMS | 0.5 | No-Flow |
| 4640 | 150 ppm PDMS + 150 ppm Ca Acid (SUNKOTE 452 BF) | 5 | Flow |
| 4640 | 150 ppm PDMS + 250 ppm Ca Acid (SUNKOTE 452 BF) | 5 | Flow |
| 4640 | 150 ppm PDMS + 150 ppm Ca Acid (CHRISCOAT 50EF-SD628) | 5 | Flow |
| 4640 | 150 ppm PDMS + 250 ppm Ca Acid (CHRISCOAT 50EF-SD628) | 5 | Flow |
| 4640 | 150 ppm PDMS + 150 ppm Ca Acid (SYNPRO CW-1250) | 5 | Flow |
| 4640 | 150 ppm PDMS + 250 ppm Ca Acid (SYNPRO CW-1250) | 5 | Flow |

Each ppm based on the weight of the dry coated pellets.

TABLE 6

Improvement in handling performance as measured with STBT

| Polymer | PDMS Coating, ppm | Ca Acid Dispersion | Ca Acid Coating (dry basis), ppm | Coating Liquid | Unconfined Yield Strength (21° C.), lb/ft$^2$ |
|---|---|---|---|---|---|
| 3640 | 150 | None | 0 | None | 80 |
| 3640 | 150 | SUNKOTE 452 BF | 250 | Ca Acid Dispersion | 0 |

TABLE 6-continued

Improvement in handling performance as measured with STBT

| Polymer | PDMS Coating, ppm | Ca Acid Dispersion | Ca Acid Coating (dry basis), ppm | Coating Liquid | Unconfined Yield Strength (21° C.), lb/ft² |
|---|---|---|---|---|---|
| 3640 | 150 | SUNKOTE 452 BF | 150 | Ca Acid Dispersion | 0 |
| 3640 | 150 | SUNKOTE 452 BF | 500 | Ca Acid Dispersion | 0 |
| 3640 | 300 | SUNKOTE 452 BF | 150 | PDMS Emulsion + Ca Acid Dispersion | 0 |
| 3640 | 300 | SUNKOTE 452 BF | 250 | PDMS Emulsion + Ca Acid Dispersion | 0 |
| 3640 | 300 | CHRISCOAT 50EF-SD628 | 150 | PDMS Emulsion + Ca Acid Dispersion | 0 |
| 3640 | 300 | CHRISCOAT 50EF-SD628 | 250 | PDMS Emulsion + Ca Acid Dispersion | 0 |
| 3640 | 300 | SYNPRO CW-1250 | 150 | PDMS Emulsion + Ca Acid Dispersion | 0 |
| 3640 | 300 | SYNPRO CW-1250 | 250 | PDMS Emulsion + Ca Acid Dispersion | 0 |

Each ppm based on the weight of the dry coated pellets.

Case 3

Polymer pellets (NORDEL 4640) were sprayed with the PDMS emulsion on a moving bed of pellets. The wet pellets were mixed by the tumbling action of the conveyor and subsequent dryer. The PDMS coated pellets were sampled at the outlet of the dryer, and loaded into a tumbling mixer. A coating formulation, comprising of Ca Acid dispersion, or a mixture of PDMS emulsion and Ca Acid dispersion, was sprayed directly on the tumbling pellets. The pellets were mixed for additional two minutes, before being discharged. The coated pellets were immediately tested for handling characteristics using the Short Term Blocking Test (STBT). The results are summarized in Table 7.

Case 4

Polymer pellets (NORDEL 3640) were sprayed with the PDMS emulsion on a moving bed of pellets. The wet pellets were mixed by the tumbling action of the conveyor and subsequent dryer. The PDMS coated pellets were sampled at the outlet of the dryer, and loaded into a tumbling mixer. A coating formulation comprising of Ca Acid dispersion was sprayed directly on the tumbling pellets. The pellets were mixed for additional two minutes, before being sampled. Additional amount of dispersion was added, followed by mixing and sampling. The coated pellets, at progressively increasing level of coating, were tested using the Short Term Blocking Test (STBT). The results are summarized in Table 8.

TABLE 7

Improvement in handling performance as measured with STBT

| Base Polymer | PDMS Coating, ppm | Ca Acid Dispersion | Ca Acid, ppm | wt ratio of PDMS to Ca Acid | Coating Liquid | Unconfined Yield Strength (21° C.), lb/ft² |
|---|---|---|---|---|---|---|
| 4640 | 150 | None | 0 | infinity | None | 65 |
| 4640 | 150 | SUNKOTE 452 BF | 250 | 0.6 | Ca Acid Dispersion | 0 |
| 4640 | 150 | SUNKOTE 452 BF | 150 | 1.0 | Ca Acid Dispersion | 0 |
| 4640 | 150 | SUNKOTE 452 BF | 500 | 0.3 | Ca Acid Dispersion | 0 |
| 4640 | 300 | SUNKOTE 452 BF | 150 | 2.0 | PDMS Emulsion + Ca Acid Disp. | 0 |
| 4640 | 300 | SUNKOTE 452 BF | 250 | 1.2 | PDMS Emulsion + Ca Acid Disp. | 0 |
| 4640 | 300 | CHRISCOAT 50EF-SD628 | 150 | 2.0 | PDMS Emulsion + Ca acid Disp. | 0 |
| 4640 | 300 | CHRISCOAT 50EF-SD628 | 250 | 1.2 | PDMS Emulsion + Ca acid Disp. | 0 |
| 4640 | 300 | SYNPRO CW-1250 | 150 | 2.0 | PDMS Emulsion + Ca Acid Disp. | 0 |

TABLE 7-continued

Improvement in handling performance as measured with STBT

| Base Polymer | PDMS Coating, ppm | Ca Acid Dispersion | Ca Acid, ppm | wt ratio of PDMS to Ca Acid | Coating Liquid | Unconfined Yield Strength (21° C.), lb/ft² |
|---|---|---|---|---|---|---|
| 4640 | 300 | SYNPRO CW-1250 | 250 | 1.2 | PDMS Emulsion + Ca Acid Disp. | 0 |

Each ppm based on the weight of the dry coated pellets.

TABLE 8

Improvement in handling performance as measured with STBT

| Base Polymer | PDMS Coating, ppm | Ca Acid Dispersion Grade | Ca Acid Coating, ppm | wt ratio of PDMS to Ca Acid | Coating Liquid | Unconfined Yield Strength, lb/ft² |
|---|---|---|---|---|---|---|
| 3640 | 150 | None | 0 | infinity | None | 109 |
| 3640 | 150 | SUNKOTE 452 BF | 16 | 9.4 | Ca Acid Dispersion | 0 |
| 3640 | 150 | SUNKOTE 452 BF | 32 | 4.7 | Ca Acid Dispersion | 0 |
| 3640 | 150 | SUNKOTE 452 BF | 48 | 3.1 | Ca Acid Dispersion | 0 |
| 3640 | 150 | SUNKOTE 452 BF | 64 | 2.3 | Ca Acid Dispersion | 0 |
| 3640 | 150 | SUNKOTE 452 BF | 80 | 1.9 | Ca Acid Dispersion | 0 |
| 4640 | 150 | SUNKOTE 452 BF | 96 | 1.6 | Ca Acid Dispersion | 0 |
| 4640 | 150 | SUNKOTE 452 BF | 112 | 1.3 | Ca Acid Dispersion | 0 |
| 4640 | 150 | SUNKOTE 452 BF | 136 | 1.1 | Ca Acid Dispersion | 0 |

Each ppm based on the weight of the dry coated pellets.

Study 3: Comparison of Sequential Addition of Components vs. Mixture of Two Components Uncoated pellets (25 kg) were sampled directly from outlet of the Spin Dryer, and tumbled in a coating drum. Each batch (25 kg) of pellets was coated with one of the following:
1. Calcium Acid dispersion only.
2. Mixture of Ca Acid dispersion and PDMS emulsion.
3. First PDMS emulsion was sprayed, pellets mixed for two minutes, then sprayed with Ca Acid dispersion and mixed for two minutes.
4. First Ca Acid dispersion was sprayed, pellets mixed for two minutes, then sprayed with PDMS emulsion and mixed for two minutes.

The coated pellets were immediately tested for handling characteristics, using the Hopper Simulation Blocking Tester (HSBT)—Table 9. The combination of PDMS emulsion and Ca Acid dispersion was found to be superior in performance, than only Ca Acid dispersion. The blocking performance of mixture versus the sequential addition approach (3 and 4) was comparable. However, from the time to discharge metric, the ranking was as follows: Mixture (best)>PDMS first/Ca Acid second>Ca Acid first/PDMS second.

TABLE 9

Improvement in handling performance as measured with HSBT

| Polymer Grade | Coating Composition on Pellets (dry basis) | Blocking After 5 minutes consolidation | Total Time To Discharge, seconds | Example |
|---|---|---|---|---|
| NORDEL 4640 | 100 ppm Ca Acid (no PDMS) | Blocked | — | Comparative |
| NORDEL 4640 | 100 ppm Ca Acid + 30 ppm PDMS (Pre-mix) | Free-flowing, complete discharge | 13 | Inventive |
| NORDEL 4640 | 30 ppm PDMS + 100 ppm Ca Acid (Sequence) | Free-flowing, complete discharge | 40 | Inventive |

TABLE 9-continued

Improvement in handling performance as measured with HSBT

| Polymer Grade | Coating Composition on Pellets (dry basis) | Blocking After 5 minutes consolidation | Total Time To Discharge, seconds | Example |
|---|---|---|---|---|
| NORDEL 4640 | 100 ppm Ca Acid + 30 ppm PDMS (Sequence) | Free-flowing, complete discharge | 76 | Inventive |

Each ppm based on the weight of the dry coated pellets. Each Metal Acid = CHRISCOAT 50EF-SD628

Study 4: Improvement of Long Term Blocking Performance of Semi-Crystalline EPDM

Semi-crystalline polymer grades are typically coated with an anti-blocking agent to keep the pellets free-flowing, when subjected to stress and temperature conditions during shipment and storage. Uncoated dry pellets of semi-crystalline grades were coated with a mixture of the PDMS emulsion and the Ca Acid dispersion, by spraying the mixture in a tumbler, and using warm air to remove the excess moisture. The dry coated pellets were tested for long term blocking performance, using the Long Term Blocking Test (LTBT), as explained earlier. The results are summarized in Table 10.

TABLE 10

Improvement in Long Term Blocking Performance of Semi-Crystalline Polymer Grades

| Base Polymer | Coating Composition on Pellets (dry basis) | Unconfined Yield Strength at 0° C., lb/ft$^2$ |
|---|---|---|
| NORDEL 3745 | 4000 PPM Talc MP 10-52 | 1127 |
| NORDEL 3745 | 8000 PPM COATHYLENE HA 2454 | 1403 |
| NORDEL 3745 | 300 ppm DMPS + 100 ppm CHRISCOAT 50EF-SD628 | 219 |
| NORDEL 3745 | 300 ppm DMPS + 250 ppm CHRISCOAT 50EF-SD628 | 40 |
| NORDEL 3745 | 300 ppm DMPS + 500 ppm CHRISCOAT 50EF-SD628 | 11 |
| NORDEL 3745 | 300 ppm DMPS + 750 ppm CHRISCOAT 50EF-SD628 | 16 |
| NORDEL 3745 | 300 ppm DMPS + 1000 ppm CHRISCOAT 50EF-SD628 | 18 |
| NORDEL 4770 | 4000 PPM Talc MP 10-52 | 552 |
| NORDEL 4770 | 8000 PPM COATHYLENE HA 2454 | 767 |
| NORDEL 4770 | 300 ppm DMPS + 100 ppm CHRISCOAT 50EF-SD628 | 389 |
| NORDEL 4770 | 300 ppm DMPS + 250 ppm CHRISCOAT 50EF-SD628 | 151 |
| NORDEL 4770 | 300 ppm DMPS + 500 ppm CHRISCOAT 50EF-SD628 | 24 |
| NORDEL 4770 | 300 ppm DMPS + 750 ppm CHRISCOAT 50EF-SD628 | 22 |
| NORDEL 4770 | 300 ppm DMPS + 1000 ppm CHRISCOAT 50EF-SD628 | 19 |

As seen in the above studies, the inventive processes can be used to form free-flowing coated pellets, which remain free-flowing upon consolidation and storage.

Study 5: Improvement of Long Term Blocking Performance of Semi-Crystalline Propylene-Ethylene Co-Polymers The following examples show improvement of long term block performance of propylene-ethylene co-polymers (VERSIFY) in accordance with the Long Term Block Test (LTBT) described earlier. Specifically, pellets of VERSIFY 3418 (density=0.8600) were coated with Coathylene HA2454 at 0.1 wt %, 0.2 wt % and 0.3 wt % as reference comparative. Inventive samples were coated with a mixture of CaSt dispersion and PDMS emulsion with subsequently drying at 40 degree C. to remove free moisture. The pellets were tested for anti-blocking effectiveness of the coatings using the Long Term Blocking Test (LTBT) as described earlier. The results are summarized in Table 11.

TABLE 11

Improvement in Long Term Blocking Performance of Semi-crystalline VERSIFY

| Polymer | Coating Composition On Pellets (dry basis) | After 2 Month Consolidation Unconfined Yield Strength (21° C.), lb/ft$^2$ | After 2 Month Consolidation Unconfined Yield Strength (0° C.), lb/ft2 | After 4 Month Consolidation Unconfined Yield Strength (21° C.), lb/ft$^2$ | After 4 Month Consolidation Unconfined Yield Strength (0° C.), lb/ft2 |
|---|---|---|---|---|---|
| VERSIFY 3418 | 0.1 wt % Coathylene HA2454 PE dust | 6 | 310 | 8 | 386 |
| VERSIFY 3418 | 0.2 wt % Coathylene HA2454 PE dust | 0 | 88 | 0 | 105 |
| VERSIFY 3418 | 0.3 wt % Coathylene HA2454 PE dust | 0 | 47 | 0 | 90 |
| VERSIFY 3418 | 100 ppm CaSt + 30 ppm polydimethylsiloxane | 0 | 24 | 0 | 26 |
| Versify 3418 | 250 ppm CaSt + 75 ppm polydimethylsiloxane | 0 | 4 | 0 | 7 |

The invention claimed is:

1. A process to form coated polymer particles, comprising polymer particles formed from a polymer composition comprising an olefin-based polymer, and a coating formed from a coating composition comprising an aqueous metal fatty acid dispersion, and an aqueous polysiloxane emulsion, said process comprising the following:
   mixing together the aqueous metal fatty acid dispersion and the aqueous polysiloxane emulsion to form a dispersion/emulsion mixture;
   applying the dispersion/emulsion mixture to a portion of the surfaces of polymer particles, to form wet-coated polymer particles;
   drying the wet-coated polymer particles to form the coated polymer particles.

2. The process of claim 1, wherein the metal fatty acid comprises a metal stearate.

3. The process of claim 1, wherein the weight ratio of the polysiloxane to the metal fatty acid, in the coated polymer particles, is from 0.10 to 10.0.

4. The process of claim 1, wherein the metal fatty acid is present in an amount from 2 ppm to 5000 ppm, based on the weight of the coated polymer particles.

5. The process of claim 1, wherein the polysiloxane is present in an amount from 20 ppm to 500 ppm, based on the weight of the coated polymer particles.

6. The process of claim 1, wherein the metal fatty acid is mixture of calcium stearate (C18) and calcium palmitate (C16).

7. The process of claim 1, wherein the polysiloxane is polydimethylsiloxane (PDMS).

8. The process of claim 1, wherein the olefin-based polymer is an ethylene-based polymer or a propylene-based polymer.

9. The process of claim 8, wherein the ethylene-based polymer is an ethylene/alpha-olefin interpolymer and the propylene-based polymer is a propylene/alpha-olefin interpolymer.

10. The process of claim 1, wherein the olefin-based polymer is an ethylene/alpha-olefin/diene terpolymer.

11. A process to form coated polymer particles, comprising polymer particles formed from a polymer composition comprising an olefin-based polymer, and a coating formed from a coating composition comprising an aqueous metal fatty acid dispersion, and an aqueous polysiloxane emulsion, said process comprising the following:
   A) applying the aqueous polysiloxane emulsion to a portion of the surfaces of polymer particles to form emulsion-coated polymer particles;
   B) applying the aqueous metal fatty acid dispersion to a portion of the surfaces of the emulsion-coated polymer particles to form dispersion-emulsion-coated polymer particles;
   C) drying the dispersion-emulsion-coated polymer particles to form the coated polymer particles; and
   wherein, optionally, the emulsion-coated polymer particles from step A are dried, before step B.

12. A process to form coated polymer particles comprising polymer particles formed from a polymer composition comprising an olefin-based polymer, and a coating formed from a coating composition comprising an aqueous metal fatty acid dispersion, and an aqueous polysiloxane emulsion, said process comprising the following:
   A) applying the aqueous metal fatty acid dispersion to a portion of the surfaces of polymer particles to form dispersion-coated polymer particles;
   B) applying the aqueous polysiloxane emulsion to a portion of the surfaces of the dispersion-coated polymer particles to form emulsion-dispersion-coated polymer particles;
   C) drying the emulsion-dispersion-coated polymer particles to form the coated polymer particles; and
   wherein, optionally, the dispersion-coated polymer particles from step A are dried, before step B.

* * * * *